United States Patent
Freeman et al.

(10) Patent No.: US 10,862,946 B1
(45) Date of Patent: Dec. 8, 2020

(54) MEDIA PLAYER SUPPORTING STREAMING PROTOCOL LIBRARIES FOR DIFFERENT MEDIA APPLICATIONS ON A COMPUTER SYSTEM

(71) Applicant: Sony Interactive Entertainment LLC, San Mateo, CA (US)

(72) Inventors: Joel Edward Freeman, San Rafael, CA (US); Peter Alfred Cruz Bautista, San Marcos, CA (US); Thomas Harold Bair, San Rafael, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 16/376,968

(22) Filed: Apr. 5, 2019

(51) Int. Cl.
*H04L 29/06* (2006.01)
*H04N 21/2662* (2011.01)
(Continued)

(52) U.S. Cl.
CPC .......... *H04L 65/608* (2013.01); *H04L 65/601* (2013.01); *H04L 65/607* (2013.01);
(Continued)

(58) Field of Classification Search
CPC . H04L 65/601; H04L 65/607; H04L 12/1804; H04L 47/70; H04L 69/72; H04N 21/2662; H04N 21/4221; H04N 21/4316; H04N 21/8586; A61N 1/37282; G06F 11/263; G06F 11/2733; G06F 16/24568;
(Continued)

(56) References Cited

U.S. PATENT DOCUMENTS

| 8,083,593 B2 | 12/2011 | White et al. |
| 9,928,279 B2 | 3/2018 | Kindig |

(Continued)

FOREIGN PATENT DOCUMENTS

| KR | 101088129 | 12/2011 |
| KR | 101693690 | 1/2017 |

OTHER PUBLICATIONS

Application No. PCT/US2020/025755, International Search Report and Written Opinion, dated Jul. 23, 2020, 11 pages.

*Primary Examiner* — Le H Luu
(74) *Attorney, Agent, or Firm* — Kilpatrick Townsend & Stockton LLP

(57) ABSTRACT

Techniques for improving media applications are described. In an example, a system presents content based on an execution of a media application that includes a first streaming protocol library. This execution includes streaming the content based on the first streaming protocol library. The system receives a user interaction with the media application indicating a request for a media player to present the content. The system receives, from the media application, content information about the content and selects a second streaming protocol library from a plurality of streaming protocol libraries of the media player. The second streaming protocol library corresponds to the first streaming protocol library. The system presents the content based on an execution of the media player and on the content information. This execution includes streaming the content based on the second streaming protocol library.

24 Claims, 15 Drawing Sheets

(51) Int. Cl.
  *H04N 21/858* (2011.01)
  *H04N 21/431* (2011.01)
  *H04N 21/422* (2011.01)

(52) U.S. Cl.
  CPC ..... *H04N 21/2662* (2013.01); *H04N 21/4221* (2013.01); *H04N 21/4316* (2013.01); *H04N 21/8586* (2013.01)

(58) Field of Classification Search
  CPC ... G06F 3/16; G06F 8/65; G06F 9/541; G06F 9/54; H04H 20/82
  See application file for complete search history.

(56) References Cited

U.S. PATENT DOCUMENTS

| | | | |
|---|---|---|---|
| 2013/0254348 A1* | 9/2013 | Mass | H04L 65/1069 709/219 |
| 2013/0305091 A1* | 11/2013 | Stan | H04L 43/50 714/35 |
| 2014/0019610 A1* | 1/2014 | Wu | G06F 16/24568 709/224 |
| 2014/0105208 A1* | 4/2014 | Pope | G06F 13/385 370/390 |
| 2014/0237292 A1* | 8/2014 | Chan | G06F 11/2733 714/32 |
| 2015/0162997 A1* | 6/2015 | Francois | H04H 20/82 381/80 |
| 2015/0346935 A1* | 12/2015 | Lauwers | H04L 12/1822 715/753 |
| 2017/0099332 A1* | 4/2017 | Bullotta | H04L 69/10 |
| 2017/0257408 A1 | 9/2017 | Gaunt et al. | |
| 2018/0088930 A1* | 3/2018 | Nelson | G06F 8/65 |
| 2018/0287958 A1* | 10/2018 | Sukoff | H04N 21/43615 |
| 2019/0104162 A1* | 4/2019 | Fallows | H04L 67/08 |
| 2019/0188006 A1* | 6/2019 | Ritter | G06F 8/433 |

* cited by examiner

MEDIA PLAYER SUPPORTING STREAMING PROTOCOL LIBRARIES FOR DIFFERENT MEDIA APPLICATIONS ON A COMPUTER SYSTEM

CROSS-REFERENCES TO RELATED APPLICATIONS

Not Applicable

BACKGROUND

The design of video game systems has been evolving over time to provide capabilities beyond merely hosting video game applications. For example, a video game system can host a media application to stream content from an online source, in addition to a video game application. The more the capabilities evolve, the more challenging the design becomes to host corresponding applications.

To illustrate, consider an example of a video game system that hosts a first media application developed by a provider of the video game system. To add a second media application of a third party, executable code specific to the second media application should be added to the second media application and/or to the video game system. However, this code is not usable to the first media application and, generally, the two media applications are designed separately. As a result, the overall design may become complex to account for the specific requirements of each application. In addition, the user experience may degrade because the two applications may not provide a consistent experience. Hence, there is a need for improving media applications on video game systems.

BRIEF SUMMARY

Techniques for improving media applications are described. The techniques can be implemented on a computer system and/or as a method implemented by the computer system. The computer system may be a video game system. In an example, the computer system includes one or more processors and one or more memories storing a media player that includes a plurality of streaming protocol libraries. The one or more memories further stores computer-readable instructions that, upon execution by the one or more processors, cause the computer system to perform operations. The operations include presenting, on a display, content based on an execution of a media application that includes a first streaming protocol library. The execution of the media application includes streaming the content based on the first streaming protocol library. The operations also include receiving, from an input device, a user interaction indicating a request for the media player to present the content. The operations also include receiving, from the media application based on the user interaction, content information about the content. The operations also include selecting a second streaming protocol library from the plurality of streaming protocol libraries based on the media application. The second streaming protocol library corresponds to the first streaming protocol library. The operations also include presenting, on the display, the content based on an execution of the media player and on the content information. The execution of the media player includes streaming the content based on the second streaming protocol library.

In an example, the media application and the media player are executed on a video game console of the computer system. The operations further include presenting, on the display, video game content based on an execution of a video game application. The content is presented by the media player while the execution of the video game application and the presentation of the video game content continue. In addition, the execution of the media application can be terminated while the presentation of the content by the media player continues In an example, the media player includes a plurality of plugins that correspond to a plurality of media applications. The operations further include selecting a plugin from the plurality of plugins based on the content information. The content is presented by the media player based on the plugin.

In an example, the user interaction corresponds to a picture-in-picture request. The content is presented by the media player in a picture-in-picture window.

In an example, the user interaction corresponds to a pinning request. The content is presented by the media player in a pinned window on a user interface of the display.

In an example, the content includes audio content and video content. The user interaction corresponds to a background audio request. Presenting the content by the media player includes the audio content only.

In an example, the content information includes a uniform resource locator (URL) of the content at a network source. The content is streamed by the media player from the network source based on the URL. In a further example, the URL includes streaming protocol information. The second streaming protocol library is selected based on the streaming protocol information. In another example, selecting the second streaming protocol library includes determining a content provider of the content based on the URL and selecting the second streaming protocol library based on the content provider.

In an example, the computer system further includes a plurality of hardware codec decoders. Presenting the content by the media player includes sending a stream of the content to at least one of the hardware codec decoders based on the second streaming protocol library. The at least one of the hardware codec decoders corresponds to a codec of the second streaming protocol library.

In an example, the operations further include receiving, from the input device, a user interaction with the media player indicating a request to terminate the media player. The operations also includes receiving, from the media player, updated content information about the content based on the user interaction with the media player. The updated content information indicates a a playback time. The operations also include restarting the execution of the media application based on terminating the media player. The presentation of the content is resumed by the media application based on the playback time.

In an example, the content is presented by the media player in a picture-in-picture window. In this example, the operations further include receiving, from the input device, a user interaction with the media player indicating a request to close the picture-in-picture window. The operations also include resizing the picture-in-picture window to fully occupy a presentation area on the display and updating, based on the resizing, a streaming bit rate according to the second streaming protocol library.

In an example, the content is presented by the media player in a picture-in-picture window. In this example, the operations further include receiving, from the input device, a user interaction with the media player indicating a request to resize the picture-in-picture window. The operations also include resizing the picture-in-picture window based on the user interaction with the media player and updating, based on the resizing, a streaming bit rate according to the second streaming protocol library.

In an example, the operations further include receiving, from the input device, a request to stream second content that is associated with a second media application. The second media application includes a third streaming protocol library. The operations also include selecting a fourth streaming protocol library from the plurality of streaming protocol libraries. The fourth streaming protocol library corresponds to the third streaming protocol library. The operations also include presenting, on the display and while the content is presented by the media player, the second content based on the execution of the media player. The execution of the media player includes streaming the second content based on the fourth streaming protocol library.

In an example, a computer system, such as a video game system, presents, on a display, content based on an execution of a media player associated with a plurality of streaming protocol libraries. The execution of the media player includes streaming the content based on a first streaming protocol library of the plurality of streaming protocol libraries. The first streaming protocol library corresponds to a second streaming protocol library associated with a media application. The computer system also receives, from an input device, a user interaction indicating a request for the media application to present the content. The computer system receives, from the media player based on the user interaction, content information about the content. The computer system presents, on the display, the content based on an execution of the media application and on the content information. The execution of the media application comprises streaming the content based on the second streaming protocol library.

In an example, the user interactions is received based on an option presented by the media player to request the media application for the presentation of the content. The option identifies at least one of the media application or a provider of the media application.

DETAILED DESCRIPTION

Figure 1:
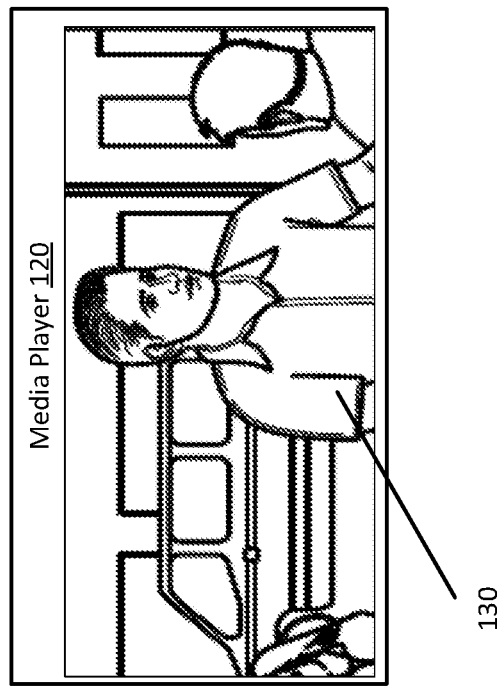
FIG. 1 illustrates an example of a media application and a media player, according to an embodiment of the present disclosure.
Figure 1:
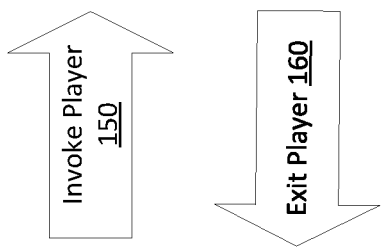
Figure 1:
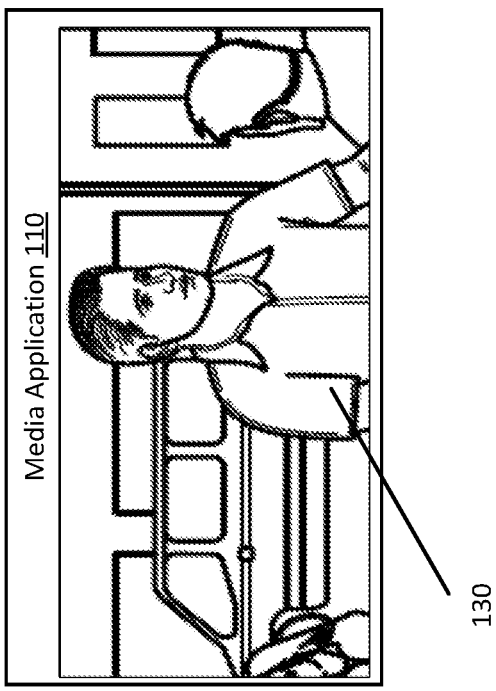

Generally, systems and methods for improving media applications are described. In an example, a video game system hosts media applications and one or more video game applications. Each of the media applications is executable to stream and present content based on a streaming protocol library. The streaming protocol libraries of the media applications need not be the same. In addition, the video game system hosts a media player that includes the streaming protocol libraries and plugins corresponding to the media applications. Hence, the media player is operational to stream and present content in a manner similar to each of the media applications and may be referred in the present disclosure as a "universal media player." Such a media player enables continuity, multi-streams, overlays, and multi-tasking. In particular, the first content may be streamed and presented by a first media application on a display. The presentation of this content may be switched to the universal media player. Similarly, a second piece of content from a second media application may be presented by the universal media player in parallel to the presentation of the first content or at a subsequent time and independently of the first content. Accordingly, the video game system can provide a consistent and multi-stream user experience of media playback to an end user across different system functions and applications. In addition, when presenting content of a media application, the universal media player can provide, based on the relevant plugin, controls and provides functionalities (e.g., overlaying closed captioning data) similarly to what the media application would have provided. Further, in parallel to the video game application presenting video game content, the universal media player may stream and present content of one or more media applications. Accordingly, the video game system provides a multi-tasking experience, whereby the end user can operate the video game system to perform multiple tasks in parallel (e.g., play a video game and watch a content stream).

To illustrate, consider the following example use cases, where the video game system hosts a first media application, a second media application, the universal media player, and a video game application. In the use cases, the first media application is developed by a provider of the video game system (e.g., a first party application) and is operational to stream live television from a content provider. The second media application is developed by a third party (e.g., a third party application) and is operational to stream movie titles. The universal media player includes a first streaming protocol library suitable for live television streaming of the content provider. The universal media player also includes a second streaming protocol library suitable for streaming the movie titles.

In a first use case, the video game application is executed to present video game content. Subsequently, user interactions are received from an input device and indicate a selection of the first media application to stream live television content and a request to present this stream as a picture-in-picture within the video game content. Accordingly, the video game system executes the universal media application and the universal media player presents the live television content in a picture-in-picture window, while the video game application continues to present the video game content.

In a second use case, the second media application is selected to stream a particular movie title. In response, the video game system executes the second media application to stream and present the movie content in a window on the display. Upon receiving user interactions with the window from an input device indicating a request to pin the window to a side of the display (e.g., a pinning request), the video game system executes the universal media player, passes content information about the movie content from the second media application to the universal media player, terminates the second media application, and proceeds with the presentation of the movie content by the universal media player in a pinned window. Subsequently, the video game application is executed and its video game content is presented in a remaining presentation area of the display while the presentation of the movie content in the pinned window continues. The pinned window may represent a window shown side-by-side the window that present the video game content.

The above example use cases are provided for illustrative purposes and the embodiments of the present disclosure are not limited as such. In the interest of clarity of explanation, the embodiments are described in connection with a video game system, a video game application, audio content, and video content. However, the embodiments are not limited as such and similarly apply to any computer system hosting on or more applications and to other types of multimedia content.

FIG. 1 illustrates an example of a media application 110 and a media player 120, according to an embodiment of the present disclosure. In this example, a video game system stores the media application 110 and the media player 120 (e.g., stores their executable code in the form of computer-readable instructions). Upon receiving user input from an input device, the video game system can execute any or both of the media application 110 and the media player 120.

Upon execution, the media application 110 streams content 130 from a media source (e.g., from a remote content server) and presents the content 130 on a display of the video game system (e.g., in a user interface, such as a graphical user interface (GUI), on the display). Specific user input can be received from the input device indicating a request of a user of the video game system to invoke 150 the media player 120. For instance, this user input may request the content 130 to be presented in a pinned window or in picture-in-picture window (or, when the content 130 includes audio content and video content, to only present the audio content in the background).

Accordingly, the video game system executes the media player 120 and passes content information about the content 130 from the media application 110 to the media player 120, as further described in connection with FIG. 3. The execution of the media application 110 can be terminated and, as such, the media application 110 may stop streaming and presenting the content 130 at a particular content location. The media player 120 includes a streaming protocol library that correspond to the streaming protocol library used by the media application 110 (e.g., both libraries are the same, such as one being a copy of the other one; or, the libraries need not be the same but each library can play the same content from the content source). Accordingly, the media player 120 (e.g., a universal media player) can stream the content 130 from the media source. Based on the content information, the media player 120 resumes the stream and presents the content 130 from the particular content location.

Conversely, specific user input can be received from the input device indicating a request of the user to exit 160 the media player 120 (or, similarly, switch back to the media application 110). For instance, this user input may request the presentation window be closed (or, when the content 130 includes audio content and video content, to also present the video content).

Accordingly, the video game system executes the media application 110 and passes content information about the content 130 from the media player 120 to the media application 110. The execution of the media player 120 can be terminated and, as such, the media player 120 may stop streaming and presenting the content 130 at a particular content location. The media player 120 includes a streaming protocol library that correspond to the streaming protocol library used by the media application 110 (e.g., both libraries are the same, such as one being a copy of the other one; or, the libraries need not be the same but each library can play the same content from the content source). Accordingly, the media application 110 can stream the content 130 from the media source. Based on the content information, the media application 110 resumes the stream and presents the content 130 from the particular content location.

Although a single media application is illustrated in FIG. 1, multiple media applications can also be hosted and executed. In such a case, the media player 120 would provide a consistent user experience across the media applications. In particular, the look and feel of the presentation window used by the media player 120 can be the same regardless of the media application 110, and the specific streaming and presentation controls and overlays of each media application can be supported by the media player 120.

In addition, the media player 120 can simultaneously stream and present content of two or more media applications. In this multi-stream example, the media player 120 uses a first streaming protocol library corresponding to a first media application to stream and present first content from a first media source. In parallel, the media player 120 uses a second streaming protocol library corresponding to a second media application to stream and present second content from a second media source. The first content and the second content can be presented in the same window (e.g., a split window) or in two different windows (e.g., side-by-side window, picture-in-picture window).

Although FIG. 1 illustrates executing the media application 110 first, invoking the media player 120 thereafter, and potentially switching back to the media application 110. However, the embodiments of the present disclosure are not limited as such. Instead, the media player 120 may be invoked first to play the content that would be also playable via the media application 110. Thereafter, the user can invoke the media application 110 to play the content instead. In this case, the media player 120 may stream the content from the same content source that the media application 110 would use, such as from a content server managed by a provider of the media application 110. The media player 120 may determine information about the content (e.g., the URL of the content, streaming information, etc.) in different ways. One way can involve placing an API call to the content server. Another way can involve caching this information based on the content being identified in a media library of the user. Yet another way can involve executing the media application 110 to receive the information from the media application 110, and upon receiving the information, optionally terminating the media application 110.

Figure 2:
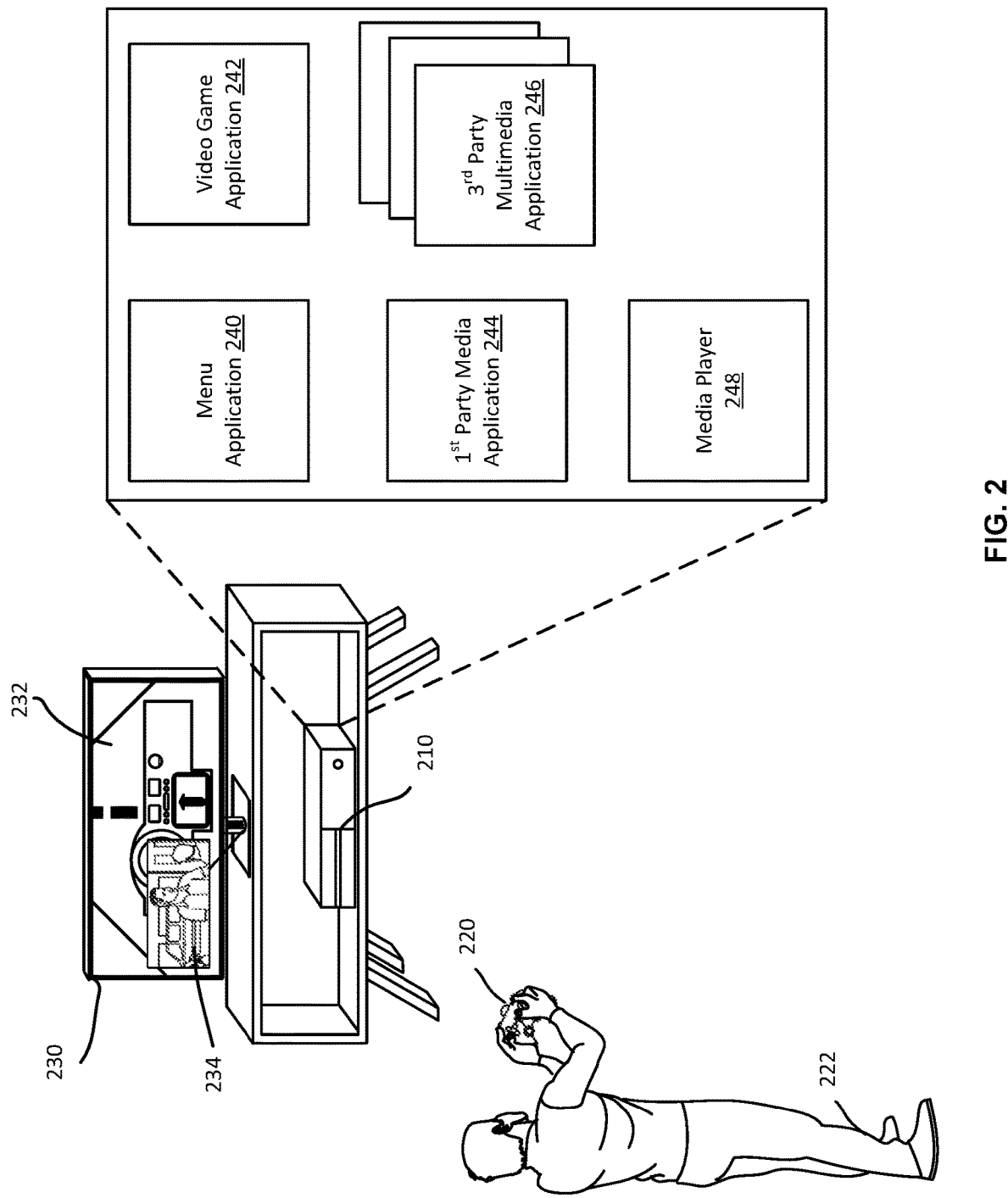
FIG. 2 illustrates an example of a computer system that hosts media applications and a media player, according to an embodiment of the present disclosure.

FIG. 2 illustrates a computer system that hosts media applications and a media player, according to an embodiment of the present disclosure. As illustrated, a video game system is an example of this computer system and includes a video game console 210, a video game controller 220, and a display 230. Although not shown, the video game system may also include a backend system, such as a set of cloud servers, that is communicatively coupled with the video game console 210. The video game console 210 is communicatively coupled with the video game controller 220 (e.g., over a wireless network) and with the display 230 (e.g., over a communications bus). A video game player 222 operates the video game controller 220 to interact with the video game console 210. These interactions may include playing a video game presented on the display 230 (illustrated as video game content 232), interacting with a content stream 234 presented on the display 230, and interacting with other applications of the video game console 210.

The video game console 210 includes a processor and a memory (e.g., a non-transitory computer-readable storage medium) storing computer-readable instructions that can be executed by the processor and that, upon execution by the processor, cause the video game console 210 to perform operations related to various applications. In particular, the computer-readable instructions can correspond to the various applications of the video game console 210 including a menu application 240, a video game application 242, one or more first party media applications 244 (FIG. 2 illustrates a single first party media application), one or more third party media applications 246 (FIG. 2 illustrates a plurality of third party media applications), and a media player 248, among other applications of the video game console 210 (e.g., a home user interface (UI) application that presents a home page on the display 230).

The video game controller 220 is an example of an input device. Other types of the input device are possible including, a remote control, a keyboard, a touchscreen, a touchpad, a mouse, an optical system, or other user devices suitable for receiving input of a user.

Figure 8:
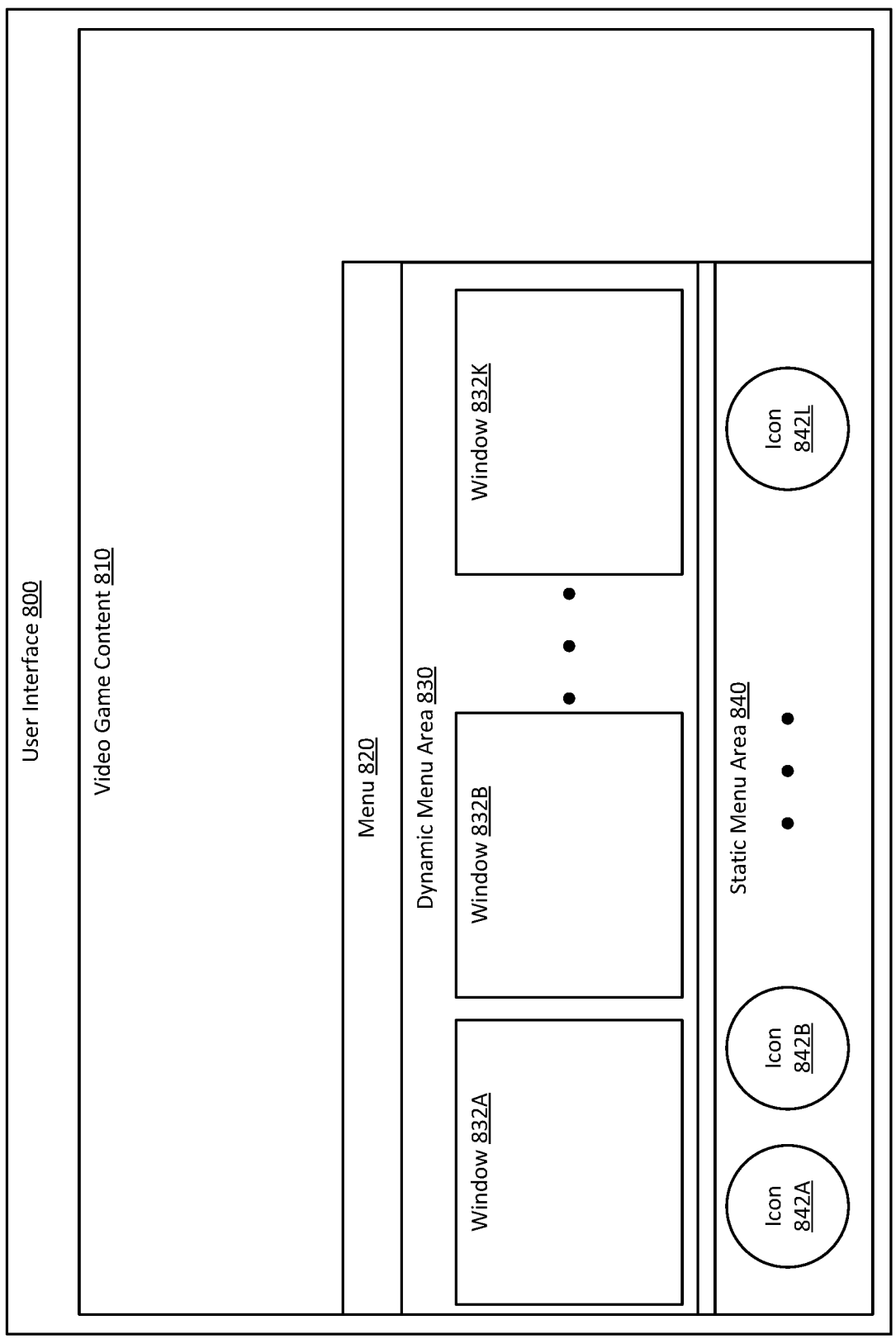
FIG. 8 illustrates an example of a user interface that presents a menu, according to embodiments of the present disclosure.

In an example, the menu application 240 is executable to present a menu on the display 230. The menu can be used to select one of the applications and/or to switch between the applications of the video game system. An example of the menu is illustrated in FIG. 8. The video game application 242 is executable to present the video game content 232 within a user interface (e.g., GUI and audio interface) of the display 230. Each of the first party media application 244 and third party media application 246 is executable to stream and present content (e.g., the content stream 234), such as audio content and/or video content, in the foreground and/or background of the user interface. The media player 248 is executable to also stream and present the content of these applications 244 and 246 one at a time or as a multi-stream.

The video game system can support multi-tasking. In particular, two or more of the applications 240-248 may execute concurrently on the video game system. Each of the applications may respectively generate an output that is presented on the display 230. In an example, the video game application 242 may generate a video game output. The video game output, itself, may include different types of video game output channels (e.g., video output channel, audio output channel, tactile feedback output channel, etc.), and each type of output channel may be presented on a component (e.g., connected device) of the display 230 (e.g., a video monitor component, a speaker component, etc., as described above). Similarly, a media application of media applications 244-246 may generate a media output, and the media output for that application may include media output channels. When two or more applications generate output at substantially the same time, and the outputs share a common channel type, the output channels may be provided as input to a rendering process. This rendering process may receive two or more output channels from different applications as input, and, utilizing a rendering algorithm, generate a composite output that is then presented. As an example, two or more video output channels may be received as input (e.g., from a first media application and a second media application) by the rendering process, which may in turn generate a composite output such that one video output channel is presented as a main (e.g., primary) window of the display 230, and the other video output is presented within the main window (e.g., secondary window such as a picture-in-picture window). Other suitable video rendering techniques (e.g., blending, transparency) may also be used. Similarly, two or more distinct audio output channels generated by separate may be provided to the rendering process that may generate a composite audio, which is then presented. In one example, the composite audio may be presented such that the video game audio output channel is presented at a lower decibel level on a speaker component of display 230 than the audio output channel of the media application.

In some embodiments, the rendering process that generates a composite output may cause one output channel to be presented in a foreground of the display 230, and another output channel to be presented in a background of the display 230. As discussed herein, presenting output in the foreground may refer to causing the output to be presented in an active layer of the display 230 that reflects that the video game player's 222 focus is on that layer. As an example, a video composite output presented on the display 230 may include one window (representing a first video output from a first media application) that overlays another window (representing a second video output from a second media application). In this case, the overlaying window is presented in an active layer and thus is in the foreground of the display 230, while the other window is in the background. Another example where an application is presented in a background may be when the application generates output (e.g., presented to a speaker component of the display 230), but any video output from the application is not presented visually on the display 230. It should be understood that there may be other ways of representing an output as being in the foreground (e.g., highlighting the perimeter of a window, movement of a cursor within a window, etc.). It should also be understood that two different applications may both be in the foreground at the same time. For example, in a picture-in-picture configuration, both the output displayed in the full screen of display 230 and the output displayed in an inset window (e.g., picture-in-picture) may be presented in an active layer, and thus both be in the foreground.

Furthermore, the video game console 210 can include hardware codec decoders, in addition or alternatively to software coded decoders. Each of such decoders is suitable for decoding a content stream depending on the underlying codec.

Although FIG. 2 illustrates that the different applications are executed on the video game console 210, the embodiments of the present disclosure are not limited as such. Instead, the applications can be executed on the backend system (e.g., the cloud servers) and/or their execution can be distributed between the video game console 210 and the backend system.

Figure 3:
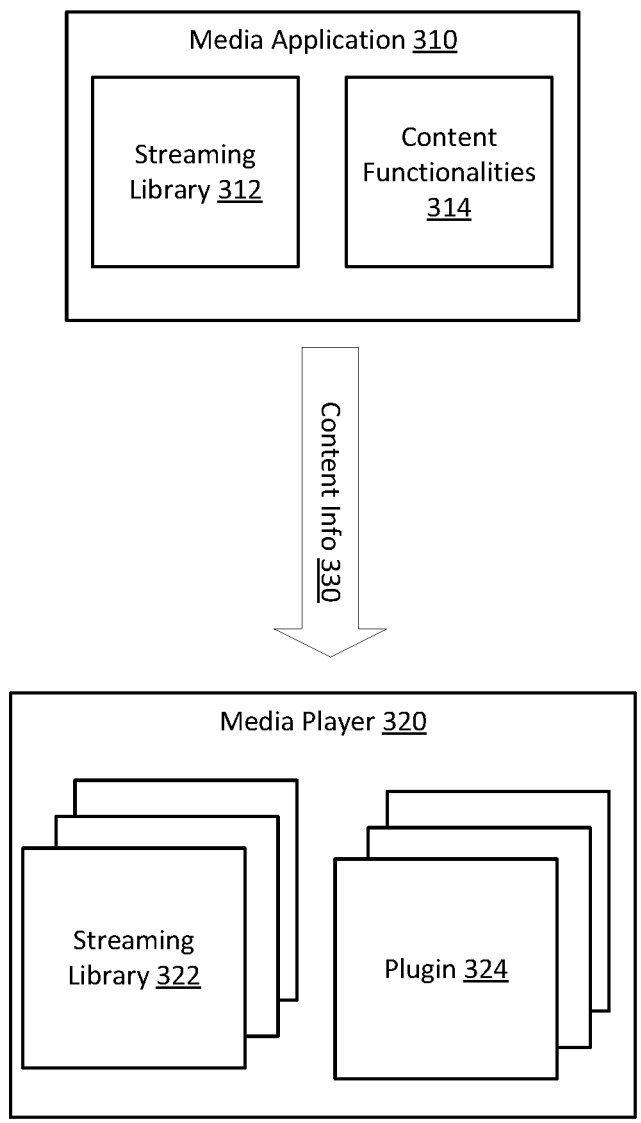
FIG. 3 illustrates an example of an exchange of content information between a media application and a media player, according to an embodiment of the present disclosure.

FIG. 3 illustrates an example of an exchange of content information 330 between a media application 310 and a media player 320, according to an embodiment of the present disclosure. The exchange facilitates to switch the streaming and presenting of content from the media application 310 to the media player 320. Whereas the media player 320 is developed by a first party, the media application 310 can be developed by the first party or a third party based on a software development kit (SDK) of the first party.

In an example, the media application 310 stores a streaming protocol library 312. Generally, the streaming protocol library 312 defines a standardized method for sending pieces of content from one device to another and for reassembling these pieces into playable content on the other end. The definition specifies, for instance, the video and audio codecs, transport/package format, playback support, segment duration, and other parameters. In an illustration, the streaming protocol library 312 can be any of MPEG-DASH, HTTP Live Streaming (HLS), Smooth Streaming, and HDS, among other available streaming protocol libraries.

In addition, the media application 310 includes executable code that provides one or more content functionalities 314. The content functionalities 314 provide one or more of controlling the streaming and presentation of content (e.g., transport controls such as play, pause, fast forward, rewind, skip, progress bar, etc.), overlays (e.g., closed captioning, title, or other metadata), and telemetries (e.g., use of the transport controls, content watched, content skipped, clickthroughs, etc.).

The media player 320 includes one or more streaming protocol libraries 322 and one or more plugins. The streaming protocol libraries 322 include a particular streaming library that corresponds to the streaming library 312. In this way, the media player 320 can stream and present content in a manner similar to the media application 310. Further, the plugins 324 include a particular plugin that corresponds to the content functionalities 314. In other words, the particular plugin represents an extension of the content functionalities 314 on the media player 320. In this way, the media player 320 can provide controls, overlays, and telemetries in a manner similar to the media application 310.

In operation, a video game system executes the media application 310. The media application streams and presents content from a media source based on the streaming protocol library 312 and the content functionalities 314. Upon receiving the relevant user input, the video game system executes the media player 320 for streaming and presenting the content from the media source in lieu or in addition to the media application 310. To do so, the video game system receives the content information 330 from the media application 310 and sends the content information 330 to the media player 320.

Generally, the content information 330 includes metadata about the content (e.g., title, closed captioning, etc.), positional data about the content presentation (e.g., the playback time, the content frame that was last presented, the progress of the content along a progress bar, etc.), and stream data relevant to streaming and presenting the content. The stream data depends on one or more factors, such as the type of the media application 310.

In an example, the media application 310 is a first party media application. In this example, the media application 310 can stream content from a content server (e.g., a movie title) and/or from a media source of a content provider (e.g., live television). In the use case of a content server, the content information 330 can include a uniform resource locator (URL) of the content at the content server (e.g., the content information 330 can identify the network address of the content). In turn, the URL can include a manifest of streaming protocol information that can facilitate the selection of a particular streaming protocol library and/or a particular processing rule of such library. For instance, the URL can include different bit rates, indicating that an adaptive streaming protocol should be used and specifying the usable bit rates.

In the above example, the media player 320 can select a particular streaming protocol library from the available streaming protocol libraries 322 by determining that the content information 330 is from the media application 310 and determining that the particular streaming protocol library matches the streaming protocol library 312 of the media application 310. A similar selection can be made for a particular plugin from the available plugins 324. In addition, if the URL includes streaming protocol information, this information can be used in the selection of the particular streaming protocol library (e.g., by determining that this library matches the streaming protocol information) and/or of a particular processing rule of the particular streaming protocol library (e.g., to use a specific bit rate).

In the use case of a content provider, the content information 330 can similarly include a URL that identifies the content provider. In this use case, the particular streaming protocol to be used by the media player 320 can be selected based on an identifier of the content provider. For instance, the media player 320 can include a mapping between identifiers of content providers and usable streaming protocol libraries. Based on the identifier of the content provider, the media player 320 determines a match to the particular streaming protocol library.

In another example, the media application 310 is a third party media application that provides a media player based on the streaming library 312. In this example, the media application 310 can stream content from a content server (e.g., a movie title). Similarly here, the content information 330 can include a uniform resource locator (URL) of the content at the content server and the URL can include a manifest of streaming protocol information that can facilitate the selection of a particular streaming protocol library and/or a particular rule or processing of such library.

In yet another example, the media application 310 is a media application (first party or third party) that provides an embedded media player. In this example, the media application 310 can load a page that includes the embedded player and present content within the page by executing the embedded media player. Here, the content information 330 can include a URL of the page. The media player 320 would load and execute the embedded player, rather than using one of its streaming protocol libraries 322 and one of its plugins 324.

As described herein above, the content information 330 is passed from the media application 310 to the media player 320 to enable the media player 320 to continue the streaming and presentation of the content. Similar content information 330 can be passed back from the media player 320 to the media application 310 to switch the streaming and the presentation back to the media application 310. For example, such content information includes a URL of the content, the content title, and the positional data. The video game system can determine that the media application 310 should be launched based on the URL and, can accordingly, execute the media application 310. Next the media application 310 can commence streaming and presenting the content based on the content title and the positional data.

In the interest of clarity and brevity of explanation, the next figures are described in connection with a picture-in-picture window. However, the embodiments of the present disclosure are not limited as such and similarly apply to other types of content presentation including a pinned window and a presentation in the background only.

Figure 4:
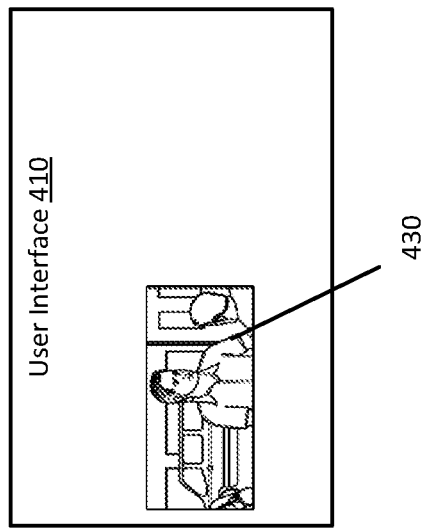
FIG. 4 illustrates an example of an operation applied to content presented by a media application resulting in a change of the presentation to a media player, according to embodiments of the present disclosure.
Figure 4:
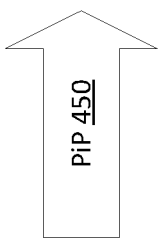
Figure 4:
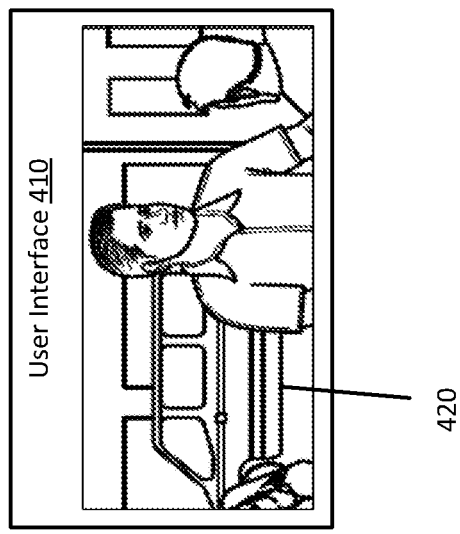

FIG. 4 illustrates an example of an operation applied to content presented by a media application resulting in a change of the presentation to a media player, according to embodiments of the present disclosure. Here, the operation is a picture-in-picture operation. As illustrated, a user interface 410 (e.g., a GUI) on a display is used to present content 420. Initially, the content 420 is streamed and presented by the media application in a window on the user interface 410. Upon a user request for picture-in-picture presentation 450, the content presentation changes to the media player. In particular, the media player streams and presents content 430 in a picture-in-picture 450 window on the user interface 410. The content 430 is streamed from the media source of the content 420 at a different bit rate and can be presented at a different resolution depending on the presentation size of the window and the presentation size of the picture-in-picture 450 window.

Figure 5:
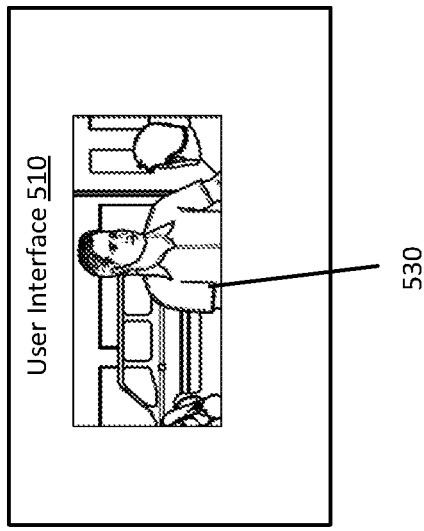
FIG. 5 illustrates an example of an operation applied to content presented by a media player, according to embodiments of the present disclosure.
Figure 5:
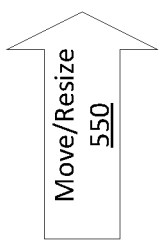
Figure 5:
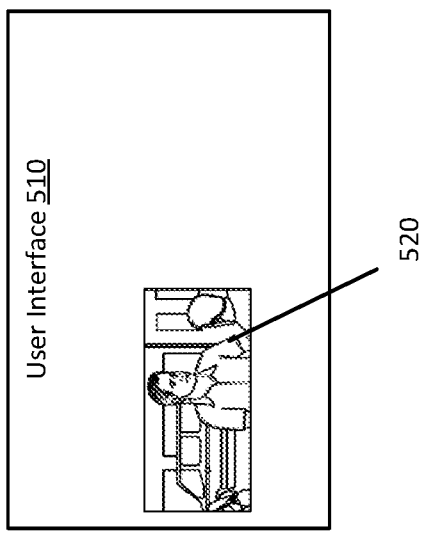

FIG. 5 illustrates an example of an operation applied to content presented by a media player, according to embodiments of the present disclosure. Here, the operation is a move and/or resize operation. As illustrated, a user interface 510 (e.g., a GUI) on a display is used to present content 520. The content 520 is streamed and presented by the media player in a window on the user interface 510 (e.g., in a picture-in-picture window). Upon a user request to move and/or resize 550 the window, the media player updates the content presentation. In particular, the media player moves the window to a desired location, as applicable, while continuing or pausing the streaming and presentation of the content 520. The media player also resizes the window to a desired size, as applicable, while continuing or pausing the streaming. Depending on the resizing (e.g., the original size and the updated size of the window), the presented content (shows as content 530) can be streamed from the media source at a different bit rate and can be presented at a different resolution.

Figure 6:
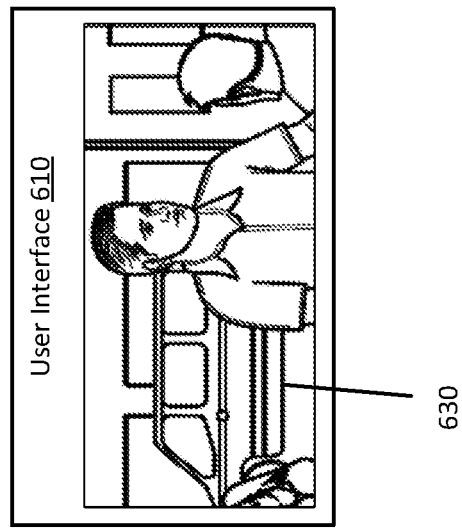
FIG. 6 illustrates an example of an operation applied to content presented by a media player resulting in a change of the presentation to a media application, according to embodiments of the present disclosure.
Figure 6:
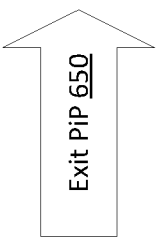
Figure 6:
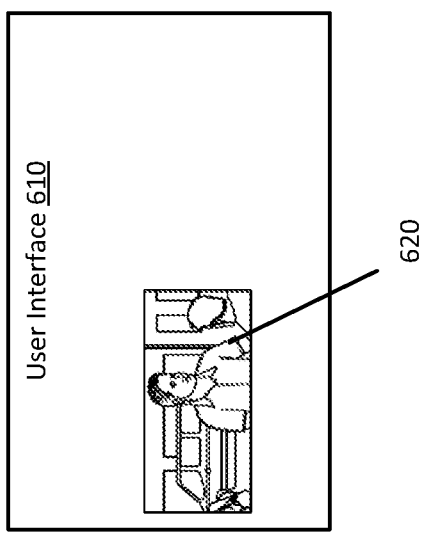

FIG. 6 illustrates an example of an operation applied to content presented by a media player resulting in a change of the presentation to a media application, according to embodiments of the present disclosure. Here, the operation is an exit operation. As illustrated, a user interface 610 (e.g., a GUI) on a display is used to present content 620. The content 620 is streamed and presented by the media player in a window on the user interface 610 (e.g., in a picture-in-picture window). Upon a user request to exit 650 the window (e.g., close), the content presentation is updated to a full screen (as illustrated, content 630 uses the full presentation area of the user interface 610).

In one example of performing the exit operation, the content presentation changes to the media application. In particular, the media application streams and presents the content 630 in full screen on the user interface 610. The content 630 is streamed from the media source of the content 620 at a different bit rate and can be presented at a different resolution depending on the presentation size of the window and the full screen size.

In another example performing the exit operation, the media player is not terminated and the media application is not invoked. Instead, the media player resizes the content 630 presentation to be full screen. This operation is similar to the resize operation discussed in connection with FIG. 5, where the updated size corresponds to the full screen.

Figure 7:
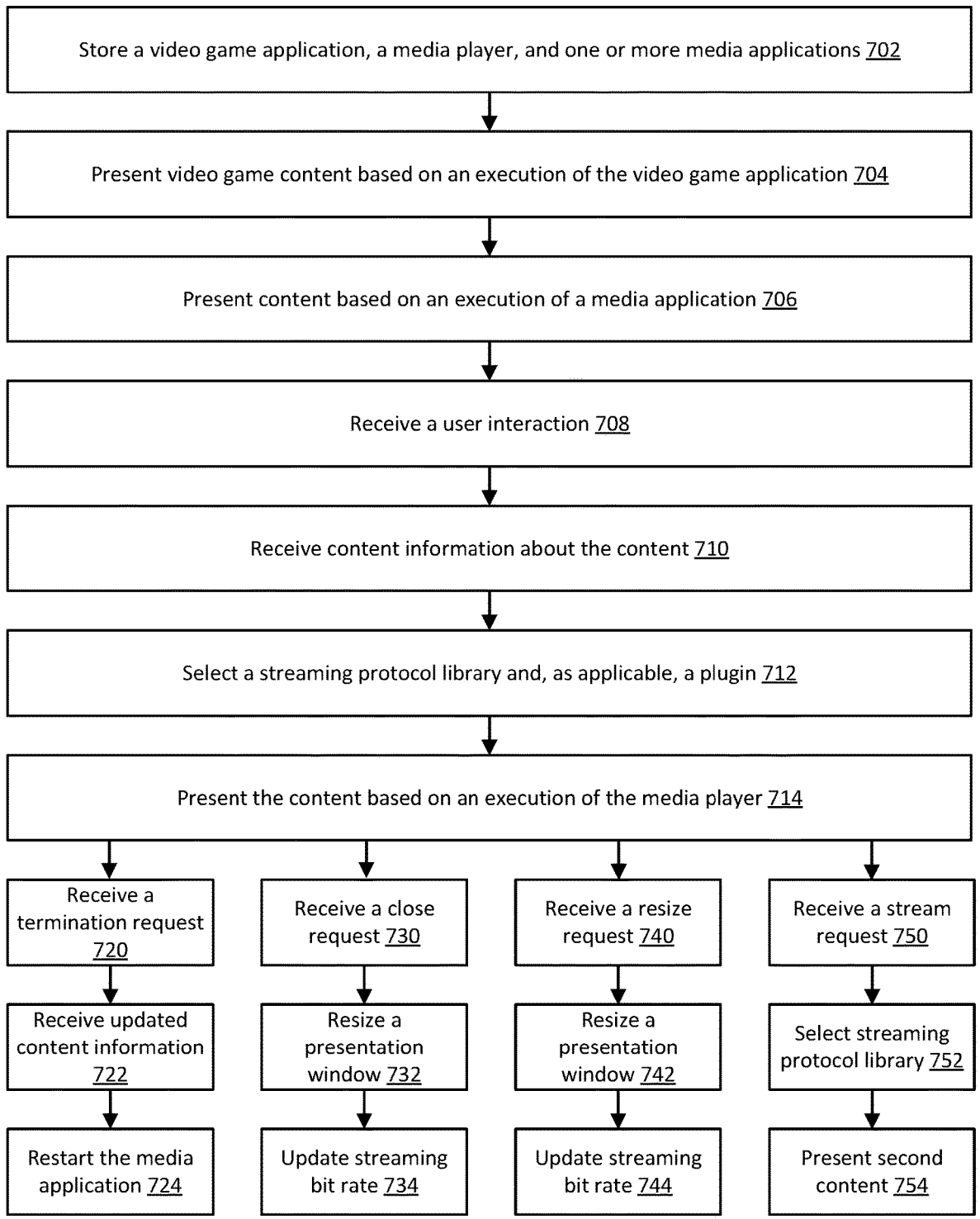
FIG. 7 illustrates an example flow for presenting content based on a media application and a media player, according to embodiments of the present disclosure.

FIG. 7 illustrates an example flow for presenting content based on a media application and a media player, according to embodiments of the present disclosure. The operations of the flow can be implemented as hardware circuitry and/or stored as computer-readable instructions on a non-transitory computer-readable medium of a video game system. As implemented, the instructions represent modules that include circuitry or code executable by a processor(s) of the video game system. The execution of such instructions causes the video game system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In an example, the flow includes an operation 702, where the video game system stores a video game application, a media player, and one or more media applications. Each of the media application includes a streaming protocol library and, optionally, code for content functionality. The media player includes a plurality of streaming protocol libraries, each of which corresponds to a media streaming protocol library of one or more of the media applications. In addition, the media player includes plugins, each of which corresponds to the content functionalities of one or more media applications.

In an example, the flow includes an operation 704, where the video game system presents video game content based on an execution of the video game application. The video game content can be presented on a display.

In an example, the flow includes an operation 706, where the video game system presents content (e.g., media content other than the video game content) based on an execution of a media application that includes a first streaming protocol library. The execution of the media application includes streaming the content from a content source (e.g., a network source where the content is stored) based on the first streaming protocol library. In an example, the content may be presented on the display in the foreground. In another example, the content may be presented in the background, as a picture-in-picture window, a pinned window, or a full screen window. If the system supports multi-tasking, the content can also be presented while the execution of the video game application and/or the presentation of the video game content continue.

In an example, the flow includes an operation 708, where the video game system receives, from an input device, a user interaction. The user interaction indicates a request for the media player to present the content. The user interaction can be with the media application (e.g., a selection of an option presented by the media application) or with a system function (e.g., via an action card as further described in the next figures). For instance, the user interaction can request, via a menu, a picture-in-picture, a pinned, or a background only presentation of the content.

In an example, the flow includes an operation 710, where the video game system receives, from the media application based on the user interaction, content information about the content. The content information can include metadata, presentation data, and stream data about the content.

In an example, the flow includes an operation 712, where the video game system selects a second streaming protocol library from the plurality of streaming protocol libraries based on the content information. The second streaming protocol library corresponds to the first streaming protocol library. In an illustration, the content information includes a URL of the content at the network source. The URL can also include streaming protocol information. In this case, the second streaming protocol library is selected based on the streaming protocol information. Alternatively or additionally, the second streaming protocol is selected by determining a content provider of the content based on the URL and selecting the second streaming protocol library based on the content provider. In addition, the media player can select a plugin that corresponds to the media application.

In an example, the flow includes an operation 714, where the video game system presents, on the display, the content based on an execution of the media player. The execution of the media player includes streaming the content based on the second streaming protocol library. In an illustration, the content can be streamed by the media player from the network source based on the URL, where this streaming follows the parameters defined by the second streaming protocol library. Further, the content is presented by decoding the content stream. The second streaming protocol library can specify a code. The media player can determine a hardware codec decoder (or, similarly, a software codec decoder) corresponding to the specified codec and can send the content stream thereto for decoding. Other operations can be performed for the presentation including, for instance, multiplexing operations. The plugin can be used to provide overlays, controls, and telemetries in conjunction with the presentation of the content by the media player. The content can be presented by the media player while the execution of the video game application and the presentation of the video game content continue. In comparison, the execution of the media application can be terminated.

Once the media player starts the streaming and presentation of the content, additional operations can be performed. These operations include switching back the presentation to the media application as illustrated with operations 720-724, resizing the presentation window based on a close request as illustrated with operation 730-734, resizing the presentation window based on a resize request as illustrated with operations 740-744, and/or multi-streaming as illustrated with operations 750-754.

In an example, the flow includes an operation 720, where the video game system receives, from the input device, a user interaction with the media player indicating a request to terminate the media player. The user interaction may be received based on a menu presented on the display and can request that the window used by the media player to present the content (e.g., the presentation window) be closed.

In an example, the flow includes an operation 722, where the video game system receives, from the media player, updated content information about the content based on the user interaction with the media player. The updated content information indicates a content frame (or some other positional data).

In an example, the flow includes an operation 724, where the video game system terminates the execution of the media player and restarts the execution of the media application based on terminating the media player. The streaming and presentation of the content is resumed by the media application based on the content frame.

In an example, the flow includes an operation 730, where the video game system receives, from the input device, a user interaction with the media player indicating a request to close the picture-in-picture window. In this example, the presentation window is a picture-in-picture window. The user interaction can be received based on a menu presented on the display.

In an example, the flow includes an operation 732, where the video game system resizes the picture-in-picture window to fully occupy a presentation area on the display. In other words, rather than terminating the media player, the media player continues to present the content, and this presentation becomes full screen.

In an example, the flow includes an operation 734, where the video game system updates, based on the resizing, a streaming bit rate according to the second streaming protocol library. For instance, the size of the content is enlarged to occupy the full screen. To maintain a good resolution, the streaming bit rate is also increased.

In an example, the flow includes an operation 740, where the video game system receives, from the input device, a user interaction with the media player indicating a request to resize the picture-in-picture window. In this example also, the presentation window is a picture-in-picture window. The user interaction can be received based on a menu presented on the display and specifies an updated size of the picture-in-picture location and, optionally, an updated location of this window on the display.

In an example, the flow includes an operation 742, where the video game system resizes the picture-in-picture window based on the user interaction with the media player. For instance, the picture-in-picture window is enlarged or reduced to the updated size and, as application, relocated to the updated location.

In an example, the flow includes an operation 744, where the video game system updates, based on the resizing, a streaming bit rate according to the second streaming protocol library. For instance the size of the content is changed. To maintain a good resolution, the streaming bit rate is also changed.

In an example, the flow includes an operation 750, where the video game system receives, from the input device, a request to stream second content that is associated with a second media application. The second media application includes a third streaming protocol library. The user interaction can be received based on a menu presented on the display.

In an example, the flow includes an operation 752, where the video game system selects a fourth streaming protocol library from the plurality of streaming protocol libraries. The fourth streaming protocol library corresponds to the third streaming protocol library; and In an example, the flow includes an operation 754, where the video game system presents, on the display and while the content continues to be streamed and presented by the media player, the second content based on the execution of the media player. The execution of the media player includes streaming the second content based on the fourth streaming protocol library. The content and second content can be presented in separate windows or in a split window.

FIG. 8 illustrates an example of a user interface that presents a menu, according to embodiments of the present disclosure. As illustrated, a graphical user interface 800 of a video game system is presented on a display. The GUI 800 presents video game content 810 of a video game application of the video game system (e.g., one executed by the video game system) and a menu 820 of a menu application of the video game system (e.g., one executed by the video game system). The menu 820 can be presented over at least a portion of the video game content 810 such that to appear in the foreground of the GUI 800 while the video game content 810 appears in the background of the GUI 800. For instance, the menu 820 and the video game content 810 are displayed within a menu window and a content window, respectively, where the menu window is shown in a layer that is over the content window and that overlaps with only a portion of the content window.

In an example, the menu 820 can occlude the portion of the video content 810 behind it or can have some degree of transparency. Additionally or alternatively, the texturing and/or brightness of the menu 820 and the video game content 810 can be set such that the menu 820 appears in the foreground and the video game content 810 appears in the background.

As illustrated, the menu 820 includes a dynamic menu area 830 and a static menu area 840. The dynamic menu area 830 presents a plurality of windows 832A, 832B, . . . , 832K, each of which corresponds to an application of the video game system. The static menu area 840 presents icons 842A, 842B, . . . , 842L, each of which corresponds to a system function (e.g., power on, volume control, etc.) or an application of the video game system. For brevity, each of the windows 832A, 832B, . . . , 832K is referred to herein as a window 832 and each of the icons 842A, 842B, . . . , 842L is referred to as an icon 842. By containing the two areas 830 and 840, the menu 820 represents a dashboard that shows contextually relevant features and relevant system functions without necessitating the user to exit their game play.

Generally, a window 832 is added to the dynamic menu area 830 based on a context of a user of the video game system (e.g., a video game player) and/or a context of an application being executed on the video game system. A context of the user (user context) generally includes any of information about the user, an account of the user, active background applications and/or services, and/or applications and/or services available to the user from the video game system or from other network environment (e.g., from a social media platform). A context of the application (application context) generally includes any of information about the application, specific content shown by the application, and/or a specific state of the application. For instance, the context of a video game player can include video game applications, music streaming applications, media applications, social media feeds that the video game player has subscribed to and similar contexts of friends of the video game player. The context of a video game application includes the game title, the game level, a current game frame, an available level, an available game tournament, an available new version of the video game application, and/or a sequel of the video game application.

Based on a context, an interest of the user in an application can be determined. Accordingly, a window for that application can be added to the dynamic area 830 of the menu 820. As the context changes over time, the interest of the user can also change, whereby a different application can be identified and added to the dynamic area 830 in lieu of or in addition to a previously added application. In this way, the dynamic area 830 can be dynamically updated over time to reflect the most likely interests of the user.

In comparison, the static menu area 840 may not offer the dynamicity of the dynamic menu area 830. Instead, the icons 842 can be preset in the static menu area 840 based on system settings and/or user settings. Upon a selection of an icon 842, a corresponding window (e.g., for a system control or for a particular background application) can be presented. The menu 820 can be dismissed while the window is presented, or alternatively, the presentation of the menu 820 persists.

Upon the presentation of the menu 820, the execution of the video game application and the presentation of the video game content 810 continue. Meanwhile, user input from an input device (e.g., from a video game controller) can be received and used to interact with the menu 820 in the dynamic area 830 and/or the static area 840. The dynamic area interactions allow the user to view windows 832 in different states, and select and perform actions on the content of the windows 832 or the windows 832 themselves. The static area interactions allow the user to select any of the icons 842 to update the system functions (e.g., change the volume) or launch a preset window for a specific application (e.g., launch a window for a music streaming application). Once the interactions end, the menu 820 is dismissed and the user control automatically switches to the video game application (e.g., without input of the user explicitly and/or solely requesting the switch). Alternatively, the switch may not be automatic and may necessitate the relevant user input to change the user control back to the video game application. In both cases, user input received from the input device can be used to interact with the video game content 810 and/or the video game application.

In an illustration, a user request is received to present the menu 820 and the menu 820 is presented accordingly over the video game content 810. Based on the context of the user, an interest of the user in a media application is determined. Further, based on the context of the video game application, an interest of the user in a game tournament is determined. Accordingly, the dynamic area 830 includes a media window (e.g., the first window 832A) corresponding to the media application and a game window (e.g., the second window 832B) corresponding to the video game application. The media window may show, in a glanced state, a cover of a media title owned by the user. The game window may show, in the glanced state, an invitation to the game tournament. Upon a user scroll, the user focus on the windows 832 is updated. In particular, when the user scroll is over the media window, that window is presented in a focused state, while the remaining windows are presented in the glanced stated. In the focused state, the size of the media window and the cover are enlarged and an option is presented to play the media title. If a user selection to play the media title is received, the media streaming and presentation is started by a universal media player, the menu 820 is dismissed, and the user control switches back to the video game application. If a user selection of the media window is received instead, an option to pin the media window to the display can be presented. Upon performing the pinning, the media window is presented on the display, the universal media player starts streaming the media title and presenting it in the pinned window, the menu 820 is dismissed, and the user control switches back to the video game application. If the user scroll continues, the media window is presented again in the glanced state. Similar interactivity with the video game application can occur. Here, if the user accepts the invitation to the game tournament, the video game application is updated to change the game play to the video game tournament and the video game content 810 would show that the video game player is joining the tournament.

Although FIG. 8 describes a window as being presented in a dynamic menu area or can be launched from an icon in a static menu area, other presentations of the window are possible. For instance, user input from the input device (e.g., a particular key push) can be associated with the window. Upon receiving the user input, the window can be presented in a layer over the video game content 810, without the need to present the menu 820.

Figure 9:
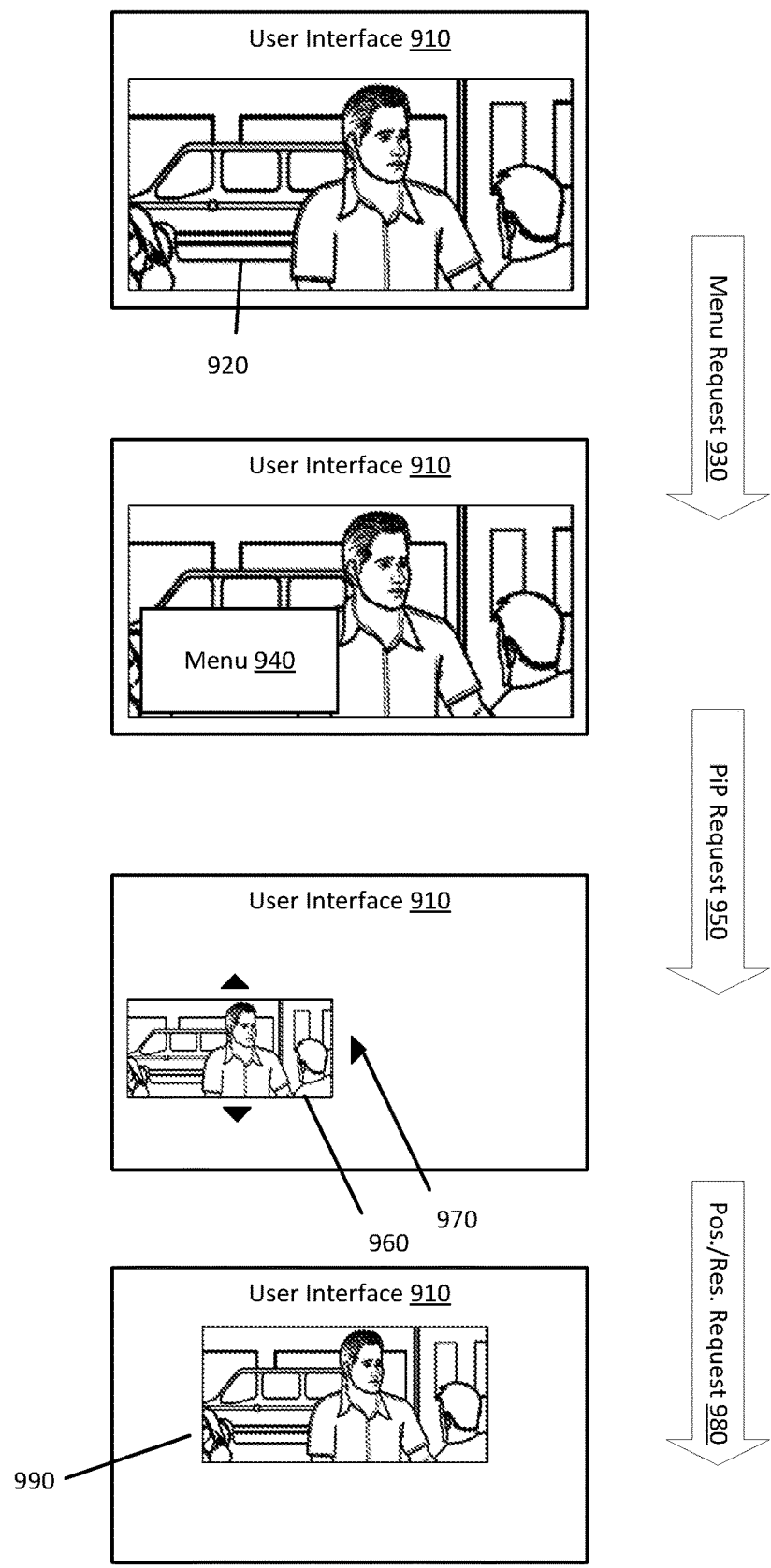
FIG. 9 illustrates an example of performing operations in a user interface on a media application and a media player, according to embodiments of the present disclosure.

FIG. 9 illustrates an example of performing operations in a user interface on a media application and a media player, according to embodiments of the present disclosure. These operations are illustrated by showing changes to a user interface 910 that presents content 920 and can be implemented as an example flow that a video game system performs.

Initially, the content 920 is presented by the media application in the user interface 910. For example, the content 920 occupies the full screen. Various mechanisms are available to trigger this presentation including, for instance, the launch of the media application from a home page, the use of a menu and a selection of a media window from the menu, as described in connection with FIG. 8, or based on natural language processing of a user utterance requesting the launch.

Next, the video game system may receive a request 930 to present a menu 940, similar to the menu 820 of FIG. 8. In response, the video game system executes a menu application that presents the menu 940 on the user interface 910, while the execution of the media application and the presentation of the content 920 by the media application continues.

Thereafter, the video game system may receive a request 950 to present the content 920 in a picture-in-picture window. In an example, this request 950 can be received based on a user interaction with a window from the menu 940, such as with an action card (action cards are further illustrated in the next figures).

Accordingly, the video game system executes the media player and terminates the execution of the media application. The media player continues the streaming of the content 920 and presents the content 940 in a picture-in-picture window 960. In addition, the media player presents options 970 to reposition and/or resize the picture-in-picture window 960 within the user interface 910.

Upon a selection of one of these options 970 (illustrated in FIG. 9 with a request 980 for reposition and/or resizing), the media player changes, as applicable, the location and/or size of the picture-in-picture window 960. In addition, as the reposition and/or resize operations are being performed, the media player can continue to present the content 920 in the picture-in-picture window 960.

Figure 10:
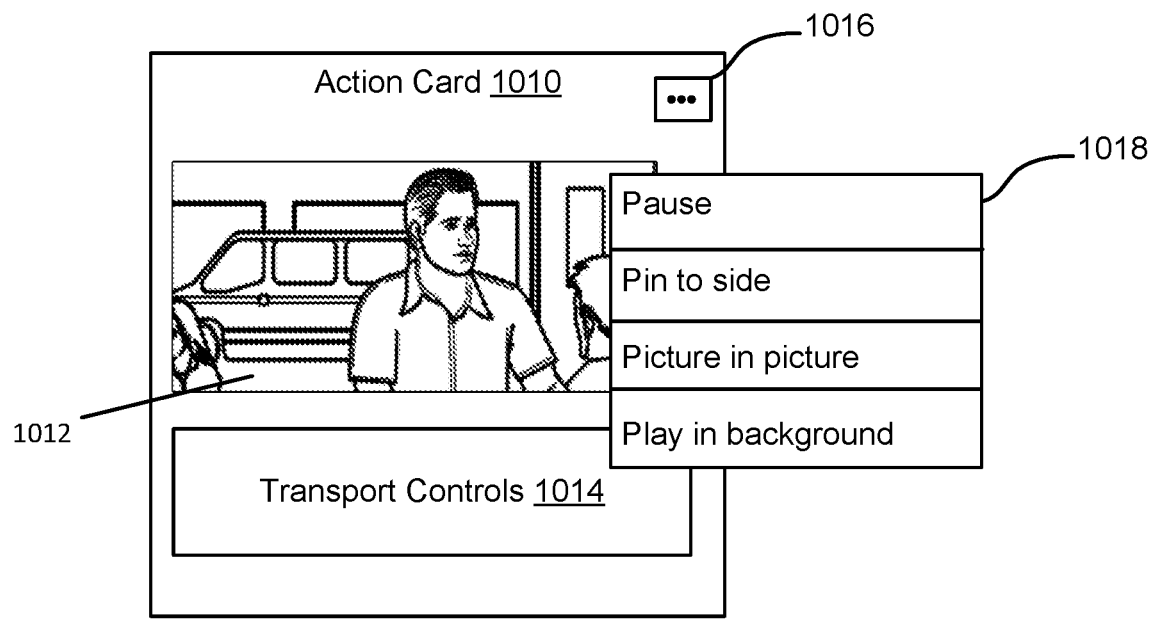
FIG. 10 illustrates an example of selectable actions to be performed by a media player, according to embodiments of the present disclosure.

FIG. 10 illustrates an example of a window available from a menu, such as the menu 820 of FIG. 8, according to embodiments of the present disclosure. Here, an action card 1010 is described as an example of the window and corresponds to an application. Generally, the window represents a GUI object that can show content and that can support an action performable on the content and/or window. In an example, the action card 1010 is a specific type of the window, where the action card a container object for MicroUX services, and where the action card contains content and actions for a singular concept. Action cards included in a menu facilitate immediate and relevant actions based on contexts of what the users are engaged with and the relationships of people, content, and services within a computer environment.

Generally, the action card 1010 can be presented in one of multiple states. Which state is presented depends on the user input. One of the states can be a glanced state, where the action card 1010 provides a glance to the user about the application. The glance includes relevant information about the action card 1010, where this information should help the user in deciding in taking an action or not. For example, in the glanced state 1010, the action card has a first size, and presents content and a title of the content based on the first size. To illustrate, an action card for a music application can be presented in the first state as a rectangle having particular dimensions, showing a cover and a title of a music album.

Another state can be a focused state, where the action card 1010 provides relevant information to the user and one or more options for one or more actions to be performed (e.g., for one or selectable actions on content of the application or the action card 1010 itself). In other words, the action card 1010 can surface quick actions for the user to select in response to the user's focus being on the action card. For example, in the focused state, the action card 1010 has a second size (which can be larger than the first size), resizes the presentation of the content and the title based on the second size, and presents one or more selectable content actions (e.g., play content, skip content, etc.) and one or more selectable card actions (e.g., move the action card to a position on the display, resize the action card 1010, pint the action card 1010, present the action card 1010 as a picture-in-picture, etc.). Referring back to the music action card illustration, in the focused state, the music cover and album title are enlarged and a play button to play music files of the music album is further presented.

Yet another state can be a selected state 1010, where the action card 1010 continues to provide relevant information to the user in a further enlarged presentation format, and provides one or more options for one or more actions to be performed on the connect and/or the action card 1010 itself (e.g., for one or selectable actions on content of the application or the action card 1010 itself). In other words, the action card 1010 becomes the primary modality for interacting with the MicroUX and displays the relevant visual interface. For example, in the selected state, the action card 1010 has a third size (which can be larger than the second size), resizes the presentation of the content and the title based on the third size, continues the presentation of the content acts, presents additional content of the application, and presents one or more options for one or more content actions and for one or more card actions that can be performed on the action card 1010. Upon a user selection of the option, the card actions are presented and can be selected. Referring back to the music action card illustration, in the selected state, the music cover and album title are further enlarged and the presentation of the play button continues. Additional music files of the music album are also identified. The option provides the choice of pinning the action card to the side of other content that is being presented on the display (e.g., video game content), presenting the action card as a picture in picture within the other content, or to run the music application (e.g., play the music album) in the background.

In the above states, the content, title, content action, and additional content can be identified from metadata received from the application. Upon performing a card action (e.g., pinning the action card), the action card 1010 becomes the user interface to the application and content can be received from the application and presented at the user interface (e.g., if a music video clip is to be presented, this clip may be played in the pinned action card).

In the particular illustration of FIG. 10, the action card 1010 is shown for a media application in a selected state. In this illustration, the action card 1010 displays content 1012 and transport controls 1014 to control the presentation of the content 1012. In addition, the action card 1010 presents an option 1016 for performing selectable actions 1018 on the content 1012 or on the action card 1010. The selectable actions 1018 include pausing the presentation of the content 1012. The selectable actions 1018 further include pinning the action card 1010 to a side of the user interface, presenting the action card 1010 in a picture-in-picture window, or playing audio of the content 1012 in the background. Upon a user selection of one or more of these selectable actions 1018, the universal media player may update the presentation of the content 1012 and transport controls 1014 to the proper presentation window.

Figure 11:
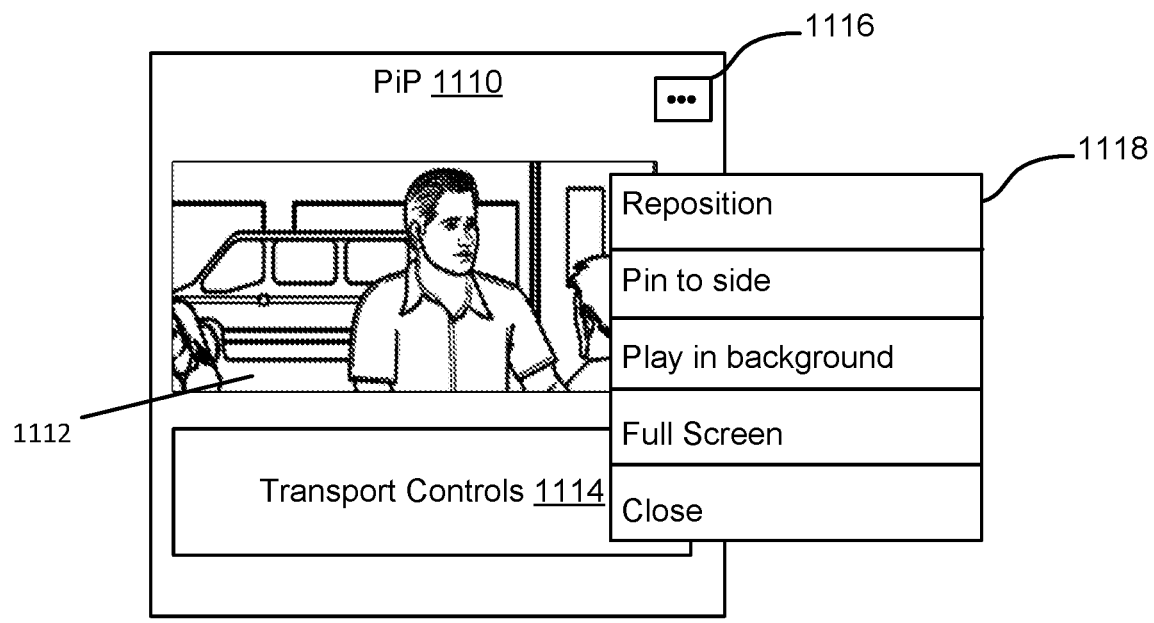
FIG. 11 illustrates another example of selectable actions to be performed by a media player, according to embodiments of the present disclosure.

FIG. 11 illustrates another example of selectable actions to be performed by a media player, according to embodiments of the present disclosure. In this example, a previously presented action card was updated to be presented as a picture-in-picture window 1110. In this case, a universal media player presents contents 1112 and transport controls 1114 in the picture-in-picture window 1110. In addition, the universal medial player presents an option 1116 for performing selectable actions 1118 on the picture-in-picture window 1110. The selectable actions 1118 include repositioning the picture-in-picture window 1110, updating the presentation to a pinning, updating the presentation to, playing audio of the content 1012 in the background, updating the presentation to a full screen, or closing the picture-in-picture window 1110. Upon a user selection of one or more of these selectable actions 1118, the universal media player may update the presentation of the picture-in-picture window 1110 as appropriate.

Figure 12:
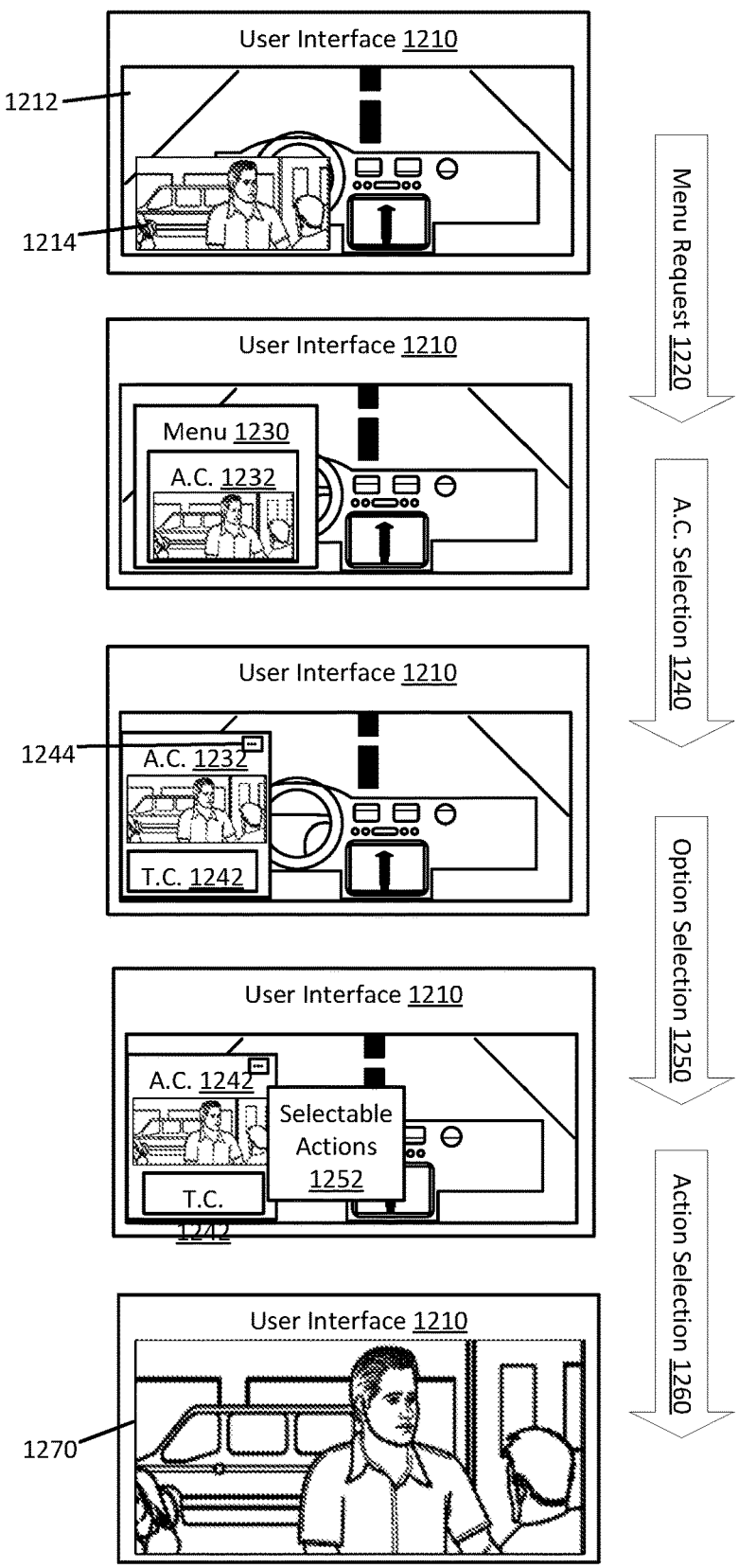
FIG. 12 illustrates an example of performing operations in a user interface on a video game application and a media player, according to embodiments of the present disclosure.

FIG. 12 illustrates an example of performing operations in a user interface on a video game application and a media player, according to embodiments of the present disclosure. These operations are illustrated by showing changes to a user interface 1210 that presents video game content 1212 and media content 1214 and can be implemented as an example flow that a video game system performs.

Initially, the video game content 1212 is presented by the video game application in the user interface 1210. In parallel, the media content 1214 is presented by the medial player in the user interface 1210. For example, the video game content 1212 is presented in full screen, while the media content 1214 is presented in a picture-in-picture window. Various mechanisms are available to trigger this presentation including, for instance, the use of a menu and a selection of a selection of a picture-in-picture operation on an media action card from the menu, or based on natural language processing of a user utterance requesting this type of presentation.

Next, the video game system may receive a request 1220 to present a menu 1230, similar to the menu 820 of FIG. 8. In response, the video game system executes a menu application that presents the menu 1230. The menu 1230 includes an action card 1232 corresponding to a media application that is associated with the content 1214. This action card 1232 may be presented in a glanced state or a focused state. The menu 1230 is presented while the execution of the video game application and the presentation of the video game content continue.

Thereafter, the video game system may receive a request 1240 to select the action 1232. In response, the menu application changes the action card to a selected state and presents transport controls 1242 and an option 1244 to invoke selectable actions.

Upon a selection of the option 1244 (illustrated in FIG. 12 with an option selection 1250), the menu application presents the selectable actions 1252. These actions can include, for instance, repositioning the picture-in-picture window 1110, updating the presentation to a pinning, updating the presentation to, playing audio of the content 1012 in the background, updating the presentation to a full screen, or closing the picture-in-picture window 1110. The selectable actions 1252 are presented while the execution of the video game application and the presentation of the video game content continue.

Upon a selection of one or more of the selectable actions (illustrated in FIG. 12 with an action selection 1260) to open the content 1214 in the media application, the menu application may present a prompt to confirm that the video game application will be terminated. Upon receiving the confirmation, the video game system executes the media player (or the media application) and presents the media 1214 in a window 1270 of the media player.

Figure 13:
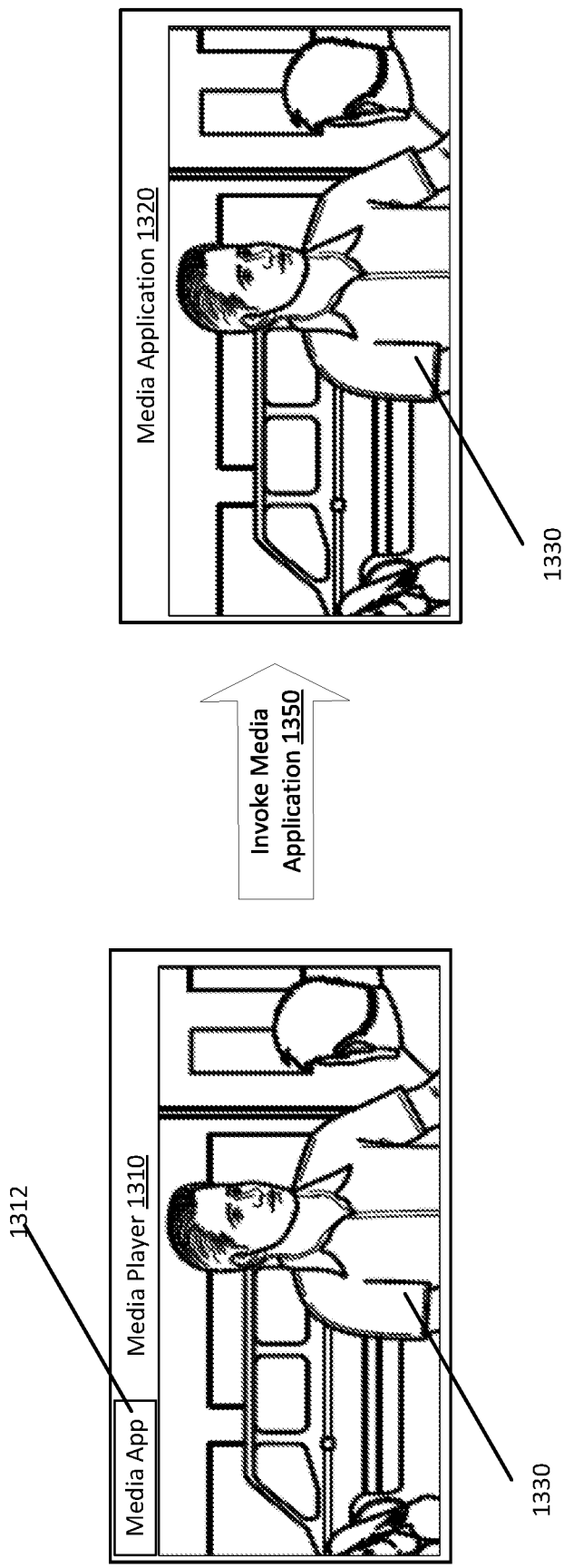
FIG. 13 illustrates an example of a media player that presents an option to switch the presentation of content to a media application, according to embodiments of the present disclosure.

FIG. 13 illustrates an example of a media player 1310 that presents an option 1312 to switch the presentation of content 1330 to a media application 1320, according to embodiments of the present disclosure. In this example, a video game system stores the media player 1310 and the media application 1320 (e.g., stores their executable code in the form of computer-readable instructions). Upon receiving user input from an input device, the video game system can execute any or both of the media player 1310 and the media application 1320.

Upon execution, the media player 1310 streams content 1330 from a media source (e.g., from a remote content server) and presents the content 1330 on a display of the video game system (e.g., in a user interface, such as a GUI, on the display). Specific user input can be received from the input device indicating a request of a user of the video game system to invoke the media player 13100. For instance, this user input may request to request a specific movie title to be launched in the media player 1310. This user input may be received in a page presenting different movie titles or trough action cards about the movie titles. The media player 1310 may determine information about the content (e.g., the URL(s) of the movie title, the media source(s), the corresponding media application(s), streaming information, etc.) in different ways. One way can involve placing an API call to the media source. Another way can involve caching this information based on the content being identified in a media library of the user. Yet another way can involve executing the media application 1320 to receive the information from the media application 1320, and upon receiving the information, optionally terminating the media application 1320.

The media player 1310 can present the option 1312 to switch the presentation the media application 1320. The option 1320 can identify the media application 1320 or a provider of the media application 1320 (e.g., if the media application has a title and is provided from a third party, the option 1312 can identify the title and/or the third party"). If multiple media applications are possible to stream the content 1330, the option 1320 may identify them all or may identify one of them based on a user preference. In this way, the user may have the option to play any content from any media source using the media player 1310, such that the user experience would be the same regardless of the actual media source. In addition, if the user has a preference for a specific media application, the option 1320 may allow the user to launch the media application instead.

Upon a user selection of the option 1312, the video game system executes the media application 1310 and passes content information about the content 1330 from the media player 1320 to the media application 1310. This content information can identify the content 1330 and the presentation location (e.g., the content frame that was last presented, the progress of the content along a progress bar, etc.). The execution of the media player 1310 can be terminated and, as such, the media player 1310 may stop streaming and presenting the content 1330 at a particular content location. The media application 1320 includes a streaming protocol library that correspond to the streaming protocol library used by the media player 1310 (e.g., both libraries are the same, such as one being a copy of the other one; or, the libraries need not be the same but each library can play the same content from the content source). Accordingly, the media application 1320 can stream the content 1330 from the media source. Based on the content information, the media application 1320 resumes the stream and presents the content 1330 from the particular content location.

Figure 14:
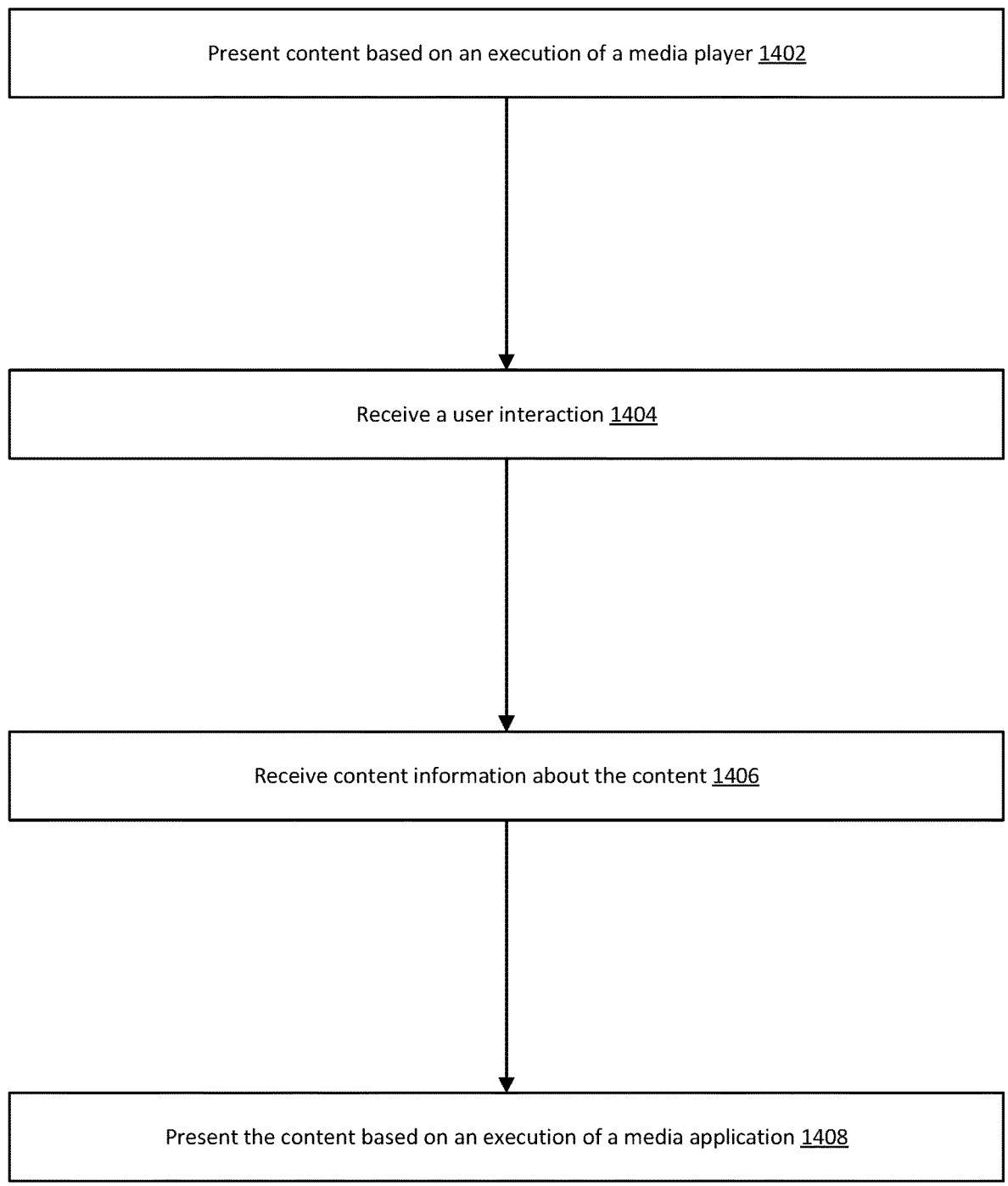
FIG. 14 illustrates an example flow for presenting content by a media player and switching the presentation to a media application, according to embodiments of the present disclosure.

FIG. 14 illustrates an example flow for presenting content by a media player and switching the presentation to a media application, according to embodiments of the present disclosure. In an example, the flow includes operation 1402 where the video game system presents, on a display, content based on an execution of a media player associated with a plurality of streaming protocol libraries. The execution of the media player includes streaming the content based on a first streaming protocol library of the plurality of streaming protocol libraries. The first streaming protocol library corresponds to a second streaming protocol library associated with a media application. The first streaming protocol library may be selected from the plurality of streaming protocol libraries based on first content information about the content. This content information can be determined in different ways including placing an API call to a media source of the content to determine the supported streaming protocol library, looking up cached data about the streaming protocol to use based on the content being identified in a media library of the user, and/or executing media application to receive the first content information.

In an example, the flow includes operation 1404, where the video game system receives, from an input device, a user interaction indicating a request for the media application to present the content. The user interaction can be with the media player (e.g., a selection of an option presented by the media player to switch the presentation of the content to the media application) or with a system function (e.g., via a menu to launch the media application).

In an example, the flow includes operation 1406, where the video game system receives, from the media player based on the user interaction, second content information about the content. The second content information can include metadata, presentation data, and stream data about the content.

In an example, the flow includes operation 1408, where the video game system presents, on the display, the content based on an execution of the media application and on the content information. The execution of the media application includes streaming the content based on the second streaming protocol library. In an illustration, the content can be streamed by the media application from the media source based on the URL, where this streaming follows the parameters defined by the second streaming protocol library. The execution of the media player can be terminated.

Figure 15:
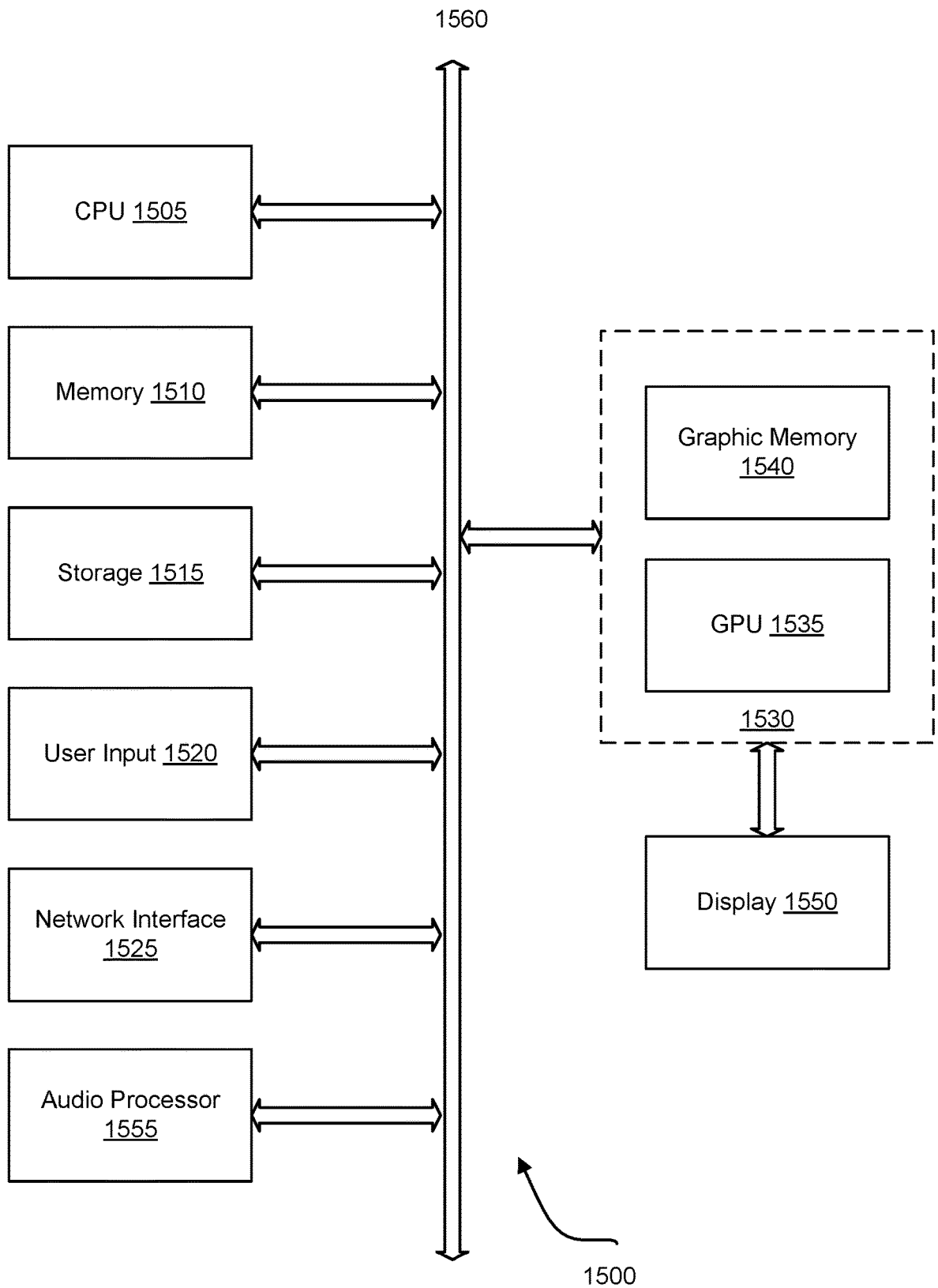
FIG. 15 illustrates an example of a hardware system suitable for implementing a computer system, according to embodiments of the present disclosure.

FIG. 15 illustrates an example of a hardware system suitable for implementing a computer system 1500, according to embodiments of the present disclosure. The computer system 1500 represents, for example, a video game system, a backend set of servers, or other types of a computer system. The computer system 1500 includes a central processing unit (CPU) 1505 for running software applications and optionally an operating system. The CPU 1505 may be made up of one or more homogeneous or heterogeneous processing cores. Memory 1510 stores applications and data for use by the CPU 1505. Storage 1515 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1520 communicate user inputs from one or more users to the computer system 1500, examples of which may include keyboards, mice, joysticks, touch pads, touch screens, still or video cameras, and/or microphones. Network interface 1525 allows the computer system 1500 to communicate with other computer systems via an electronic communications network, and may include wired or wireless communication over local area networks and wide area networks such as the Internet. An audio processor 1555 is adapted to generate analog or digital audio output from instructions and/or data provided by the CPU 1505, memory 1510, and/or storage 1515. The components of computer system 1500, including the CPU 1505, memory 1510, data storage 1515, user input devices 1520, network interface 1525, and audio processor 1555 are connected via one or more data buses 1560.

A graphics subsystem 1530 is further connected with the data bus 1560 and the components of the computer system 1500. The graphics subsystem 1530 includes a graphics processing unit (GPU) 1535 and graphics memory 1540. The graphics memory 1540 includes a display memory (e.g., a frame buffer) used for storing pixel data for each pixel of an output image. The graphics memory 1540 can be integrated in the same device as the GPU 1535, connected as a separate device with the GPU 1535, and/or implemented within the memory 1510. Pixel data can be provided to the graphics memory 1540 directly from the CPU 1505. Alternatively, the CPU 1505 provides the GPU 1535 with data and/or instructions defining the desired output images, from which the GPU 1535 generates the pixel data of one or more output images. The data and/or instructions defining the desired output images can be stored in the memory 1510 and/or graphics memory 1540. In an embodiment, the GPU 1535 includes 3D rendering capabilities for generating pixel data for output images from instructions and data defining the geometry, lighting, shading, texturing, motion, and/or camera parameters for a scene. The GPU 1535 can further include one or more programmable execution units capable of executing shader programs.

The graphics subsystem 1530 periodically outputs pixel data for an image from the graphics memory 1540 to be displayed on the display device 1550. The display device 1550 can be any device capable of displaying visual information in response to a signal from the computer system 1500, including CRT, LCD, plasma, and OLED displays. The computer system 1500 can provide the display device 1550 with an analog or digital signal.

In accordance with various embodiments, the CPU 1505 is one or more general-purpose microprocessors having one or more processing cores. Further embodiments can be implemented using one or more CPUs 1505 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 76%, 85%, 90%, 100%, 105%, 109%, 109.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A computer system comprising:
    one or more processors; and
    one or more memories storing a media player that includes a plurality of streaming protocol libraries, the one or more memories further storing computer-readable instructions that, upon execution by the one or more processors, cause the computer system to:
        present, on a display, content based on an execution of a media application that includes a first streaming protocol library, wherein the execution of the media application comprises streaming the content based on the first streaming protocol library;
        receive, from an input device, a user interaction indicating a request for the media player to present the content;
        receive, from the media application based on the user interaction, content information about the content;
        select a second streaming protocol library from the plurality of streaming protocol libraries based on the media application, wherein the second streaming protocol library corresponds to the first streaming protocol library; and
        present, on the display, the content based on an execution of the media player and on the content information, wherein the execution of the media player comprises streaming the content based on the second streaming protocol library.

2. The computer system of claim 1, wherein the media application and the media player are executed on a video game console of the computer system.

3. The computer system of claim 1, wherein the execution of the computer-readable instructions further cause the computer system to present, on the display, video game content based on an execution of a video game application, and wherein the content is presented by the media player while the execution of the video game application and the presentation of the video game content continue.

4. The computer system of claim 3, wherein the execution of the media application is terminated while the presentation of the content by the media player continues.

5. The computer system of claim 1, wherein the media player includes a plurality of plugins that correspond to a plurality of media applications, wherein the execution of the computer-readable instructions further cause the computer system to select a plugin from the plurality of plugins based on the content information, and wherein the content is presented by the media player based on the plugin.

6. The computer system of claim 1, wherein the user interaction corresponds to a picture-in-picture request, and wherein the content is presented by the media player in a picture-in-picture window.

7. The computer system of claim 1, wherein the user interaction corresponds to a pinning request, and wherein the content is presented by the media player in a pinned window on a user interface of the display.

8. The computer system of claim 1, wherein the content comprises audio content and video content, wherein the user interaction corresponds to a background audio request, and wherein presenting the content by the media player comprises presenting the audio content only.

9. The computer system of claim 1, wherein the content information comprises a uniform resource locator (URL) of the content at a network source, and wherein the content is streamed by the media player from the network source based on the URL.

10. The computer system of claim 9, wherein the URL comprises streaming protocol information, and wherein the second streaming protocol library is selected based on the streaming protocol information.

11. The computer system of claim 9, wherein selecting the second streaming protocol library comprises determining a content provider of the content based on the URL and selecting the second streaming protocol library based on the content provider.

12. The computer system of claim 1, further comprising a plurality of hardware codec decoders, and wherein presenting the content by the media player comprises sending a stream of the content to at least one of the hardware codec decoders based on the second streaming protocol library, wherein the at least one of the hardware codec decoders corresponds to a codec of the second streaming protocol library.

13. A method implemented by a computer system, the method comprising:
- presenting, on a display, content based on an execution of a media application that includes a first streaming protocol library, wherein the execution of the media application comprises streaming the content based on the first streaming protocol library;
- receiving, from an input device, a user interaction indicating a request for a media player to present the content;
- receiving, from the media application based on the user interaction, content information about the content;
- selecting a second streaming protocol library from a plurality of streaming protocol libraries of the media player based on the media application, wherein the second streaming protocol library corresponds to the first streaming protocol library; and
- presenting, on the display, the content based on an execution of the media player and on the content information, wherein the execution of the media player comprises streaming the content based on the second streaming protocol library.

14. The method of claim 13, further comprising:
- receiving, from the input device, a user interaction with the media player indicating a request to terminate the media player;
- receiving, from the media player, updated content information about the content based on the user interaction with the media player, wherein the updated content information indicates a playback time; and
- restarting the execution of the media application based on terminating the media player, wherein the presentation of the content is resumed by the media application based on the playback time.

15. The method of claim 13, wherein the content is presented by the media player in a picture-in-picture window, and further comprising:
- receiving, from the input device, a user interaction with the media player indicating a request to close the picture-in-picture window;
- resizing the picture-in-picture window to fully occupy a presentation area on the display; and
- updating, based on the resizing, a streaming bit rate according to the second streaming protocol library.

16. The method of claim 13, wherein the content is presented by the media player in a picture-in-picture window, and further comprising:
- receiving, from the input device, a user interaction with the media player indicating a request to resize the picture-in-picture window;
- resizing the picture-in-picture window based on the user interaction with the media player; and
- updating, based on the resizing, a streaming bit rate according to the second streaming protocol library.

17. The method of claim 13, further comprising:
- receiving, from the input device, a request to stream second content that is associated with a second media application, wherein the second media application comprises a third streaming protocol library;
- selecting a fourth streaming protocol library from the plurality of streaming protocol libraries, wherein the fourth streaming protocol library corresponds to the third streaming protocol library; and
- presenting, on the display and while the content is presented by the media player, the second content based on the execution of the media player, wherein the execution of the media player comprises streaming the second content based on the fourth streaming protocol library.

18. One or more non-transitory computer-readable storage media storing instructions that, upon execution on a computer system, cause the computer system to perform operations comprising:
- presenting, on a display, content based on an execution of a media application that includes a first streaming protocol library, wherein the execution of the media application comprises streaming the content based on the first streaming protocol library;

receiving, from an input device, a user interaction indicating a request for a media player to present the content;

receiving, from the media application based on the user interaction, content information about the content;

selecting a second streaming protocol library from a plurality of streaming protocol libraries of the media player based on the media application, wherein the second streaming protocol library corresponds to the first streaming protocol library; and presenting, on the display, the content based on an execution of the media player and on the content information, wherein the execution of the media player comprises streaming the content based on the second streaming protocol library.

19. The one or more non-transitory computer-readable storage media of claim 18, wherein the content information comprises a uniform resource locator (URL) of the content at a network source, and wherein the content is streamed by the media player from the network source based on the URL.

20. The one or more non-transitory computer-readable storage media of claim 19, wherein the URL comprises streaming protocol information, and wherein the second streaming protocol library is selected based on the streaming protocol information.

21. The one or more non-transitory computer-readable storage media of claim 19, wherein selecting the second streaming protocol library comprises determining a content provider of the content based on the URL and selecting the second streaming protocol library based on the content provider.

22. A method implemented by a computer system, the method comprising:

presenting, on a display, content based on an execution of a media player associated with a plurality of streaming protocol libraries, wherein the execution of the media player comprises streaming the content based on a first streaming protocol library of the plurality of streaming protocol libraries, wherein the first streaming protocol library corresponds to a second streaming protocol library associated with a media application;

receiving, from an input device, a user interaction indicating a request for the media application to present the content;

receiving, from the media player based on the user interaction, content information about the content; and presenting, on the display, the content based on an execution of the media application and on the content information, wherein the execution of the media application comprises streaming the content based on the second streaming protocol library.

23. The method of claim 22, wherein the user interaction is received based on an option presented by the media player to request the media application for the presentation of the content.

24. The method of claim 23, wherein the option identifies at least one of the media application or a provider of the media application.

* * * * *